United States Patent [19]

Takahata et al.

[11] Patent Number: 4,621,921
[45] Date of Patent: Nov. 11, 1986

[54] ORIGINAL FEEDING APPARATUS

[75] Inventors: Naomi Takahata, Yokohama; Takeshi Honjo, Kawasaki, both of Japan

[73] Assignee: Canon Kabushiki Kaisha, Tokyo, Japan

[21] Appl. No.: 636,858

[22] Filed: Aug. 1, 1984

[30] Foreign Application Priority Data

| Aug. 5, 1983 | [JP] | Japan | 58-142439 |
| Aug. 5, 1983 | [JP] | Japan | 58-142440 |
| Aug. 5, 1983 | [JP] | Japan | 58-142441 |
| Aug. 5, 1983 | [JP] | Japan | 58-142442 |
| Aug. 5, 1983 | [JP] | Japan | 58-142443 |
| Aug. 5, 1983 | [JP] | Japan | 58-142444 |
| Aug. 5, 1983 | [JP] | Japan | 58-142445 |
| Aug. 5, 1983 | [JP] | Japan | 58-142446 |

[51] Int. Cl.$^4$ ............................................. G03G 15/00
[52] U.S. Cl. ............................. 355/14 SH; 355/14 R; 355/3 SH; 355/3 R
[58] Field of Search ............... 355/3 SH, 14 SH, 3 R, 355/14 R, 24, 25; 271/3.1, 4

[56] References Cited

U.S. PATENT DOCUMENTS

| 4,411,517 | 10/1983 | Gerken | 355/14 SH |
| 4,421,404 | 12/1983 | Conly | 355/14 SH X |
| 4,422,751 | 12/1983 | Komiya et al. | 355/14 SH |
| 4,508,447 | 4/1985 | Doery | 355/14 SH |

Primary Examiner—A. C. Prescott
Attorney, Agent, or Firm—Fitzpatrick, Cella, Harper & Scinto

[57] ABSTRACT

A copying machine with an ADF, has an AF section for separating originals in an original tray one by one, a DF section for feeding the separated original to an exposure position on a photosensitive drum, a normal original insertion port for receiving originals during normal operation, a return original insertion port for allowing insertion of return originals which must be fed again after a jam has occurred, sensors for detecting the number of copies which have been produced, the number of return originals, and the number of sheets remaining in the machine, and microcomputers for controlling the operation of the copying machine and the ADF. An interrupt copy operation can be performed with a simple operation at any time.

18 Claims, 25 Drawing Figures

ORIGINAL FEEDING APPARATUS

BACKGROUND OF THE INVENTION

1. Field of the Invention

The present invention relates to an original feeding apparatus (ADF: automatic document feeder) which is used in an image forming apparatus such as a copying machine to feed an original to a predetermined position, or to an image forming apparatus having such an original feeding apparatus.

2. Description of the Prior Art

An ADF is used in an image forming apparatus such as a copying machine to sequentially feed documents or originals to the exposure position. In a conventional image forming apparatus of this type, when an interrupt copy operation is to be performed during a copy operation of a plurality of originals using the ADF, the interrupt key at a control panel of the copying machine must be depressed to stop the overall system. Thereafter, the ADF is opened to set the original to be copied in the interrupt copy operation. Thereafter the ADF is closed, and the copy start button is depressed. In order to resume the previous copy operation after the interrupt copy operation is performed, the remaining originals to be copied must be set in the ADF and the copy start button must be depressed again.

In this manner, the conventional ADF operates poorly and is cumbersome to the operator. In view of this, the user does not generally want to perform an interrupt copy operation but rather waits for a long copy operation to finish first.

In an ADF of this type, when the original is exposed, the ADF exchanges the originals to improve the copying speed.

When an abnormal conveyance such as jamming is detected in the copying machine, it is generally associated with the copy sheet which has already been discharged out of the copying machine. In such a case, in the conventional ADF, the operator must compare the copied sheets and the originals to check for the number of originals which have already been discharged outside the copying machine and must therefore be copied again. Then, the operator resets both originals (to be referred to as return originals hereinafter) which must be copied again, and originals remaining in the original tray, and then depresses the copy start key and the like to resume the copy operation.

In a conventional apparatus of this type, therefore, the operability against an abnormality such as jamming is poor. If the operator does not reset the return originals and the originals in the original tray but simply places the return originals on the originals in the original tray and depresses the copy start button, jamming is frequently caused and the originals may be damaged.

When jamming or the like occurs in the copying machine on which such an ADF is mounted, the next original which was being fed by the ADF may be at the exposure position. When the operator resumes the copy operation by depressing the copy start button after the abnormality is removed, the operator may forget to return this original and therefore fail to produce a copy of this original. Even if the operator remembers about this original, he must pick up the original to be copied again and perform the copy operation for this again, thus resulting in a cumbersome operation.

In an ADF of this type, during the copy operation of an original (to be referred to as a previous original) placed on a glass platen of the copying machine, an original (to be referred to as a next original) is conveyed to a position near the glass platen. As a result, the separation/convey operation of the next original may coincide with the exposure operation of the previous original. This results in an increase in power consumption of the overall system. Especially with a domestic copying machine wherein the total power consumption is limited to a predetermined value due to the power source capacity, a strict design requirement is imposed. This may prevent use of the system by a general user.

SUMMARY OF THE INVENTION

The present invention has been made in consideration of this and has as its object to provide an improved original feeding apparatus.

It is another object of the present invention to provide an original feeding apparatus with improved operability.

It is still another object of the present invention to provide an original feeding apparatus which reduces the work load of an operator when an interrupt copy operation is performed.

It is still another object of the present invention to provide an original feeding apparatus which reduces the work load of the operator when an abnormality occurs in an image forming apparatus.

It is still another object of the present invention to provide an original feeding apparatus which has a plurality of original insertion means which can be used for different purposes.

It is still another object of the present invention to provide an original feeding apparatus which has a normal original insertion means and an interrupt original insertion means.

It is still another object of the present invention to provide an original feeding apparatus which actuates the interrupt original insertion means after a predetermined operation has been performed for the original inserted by the normal original insertion means.

It is still another object of the present invention to provide an original feeding apparatus which has a normal original insertion means and a special original insertion means for allowing insertion of an original when an abnormality occurs.

It is still another object of the present invention to provide an original feeding apparatus which can automatically switch from the normal original insertion means to the special original insertion means after the image formation of an original inserted through the normal original insertion means when an abnormality occurs.

It is still another object of the present invention to provide an original feeding apparatus which displays the number of originals which must be copied again when an abnormality occurs.

It is still another object of the present invention to provide an original feeding apparatus which displays the number of paper sheets in an image forming means and the number of originals which must be copied again when an abnormality occurs.

It is still another object of the present invention to provide an original feeding apparatus which alternately displays the number of paper sheets in an image forming means and the number of originals which must be copied again when an abnormality occurs in the image forming means.

It is still another object of the present invention to provide an original feeding apparatus which discharges the original in the original feeding means when an abnormality occurs in the image forming means.

It is still another object of the present invention to provide an original feeding apparatus which reduces power consumption.

It is still another object of the present invention to provide an original feeding apparatus in which the original separation operation in the original feeding means and the exposure operation in the image forming means are not performed simultaneously.

The above and other objects of the present invention will become apparent from the following description when taken in conjunction with the accompanying drawings.

DETAILED DESCRIPTION OF THE PREFERRED EMBODIMENTS

The preferred embodiment of the present invention will be described in detail with reference to the accompanying drawings.

Figure 1:
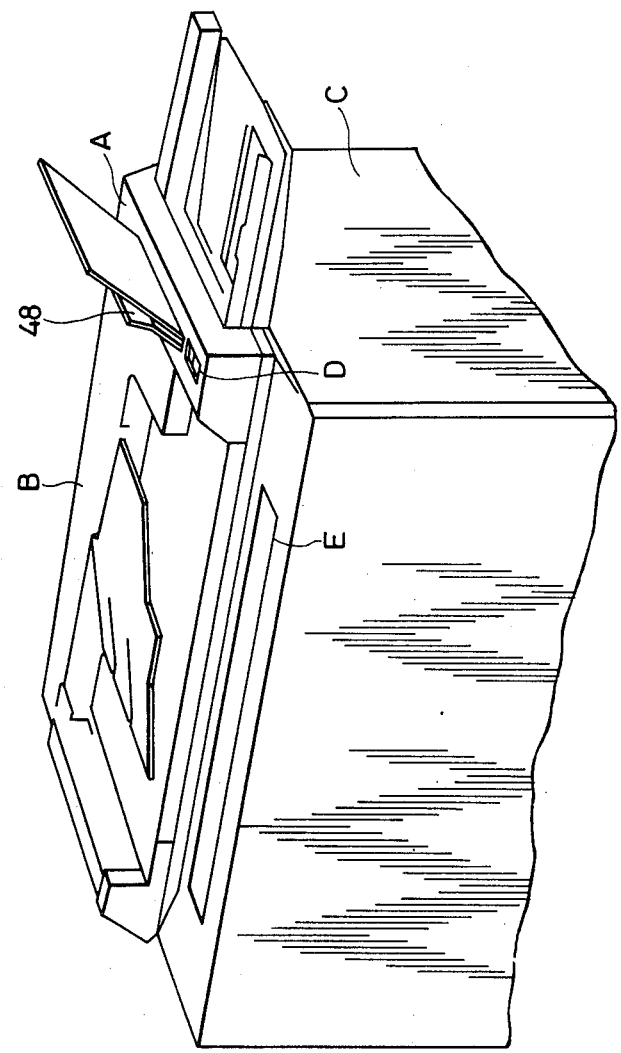
FIG. 1 is a perspective view of a copying machine on which an original feeding apparatus is mounted.

FIG. 1 is a perspective view of an image forming apparatus (copying machine) having an original feeding apparatus (to be referred to as an ADF hereinafter). The system shown in FIG. 1 has an original feeder section (to be referred to as AF) A for separating one original from a plurality of originals and supplying the separated original, an original setter section (to be referred to as DF) B for feeding the original to the exposure position, a copying machine main body C, and a control portion D having a start key, a jam indication lamp and the like.

Figure 2A:
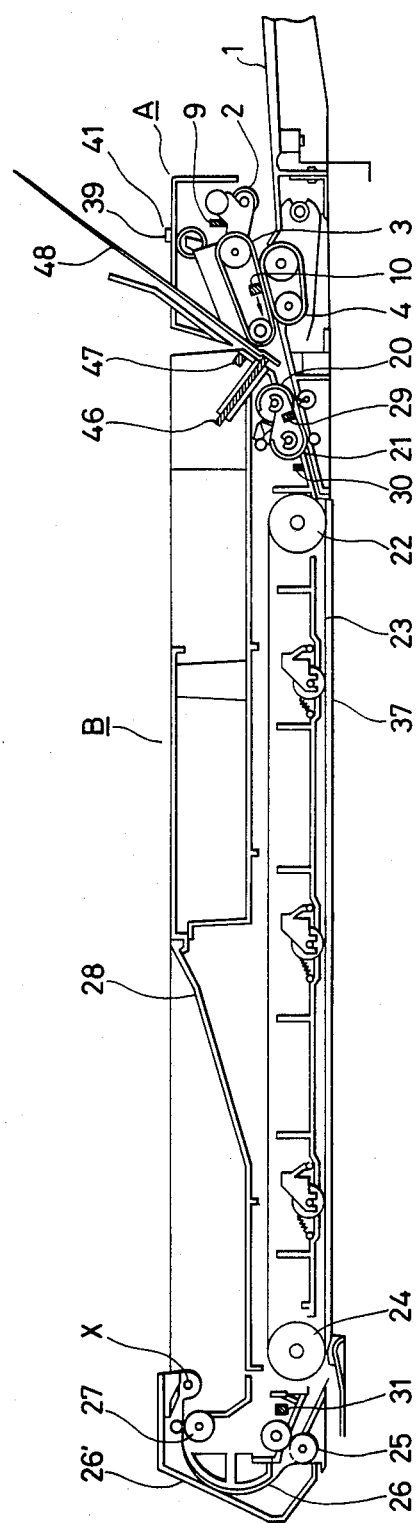
FIG. 2A is a sectional view showing the construction of the original feeding apparatus.
Figure 2B:
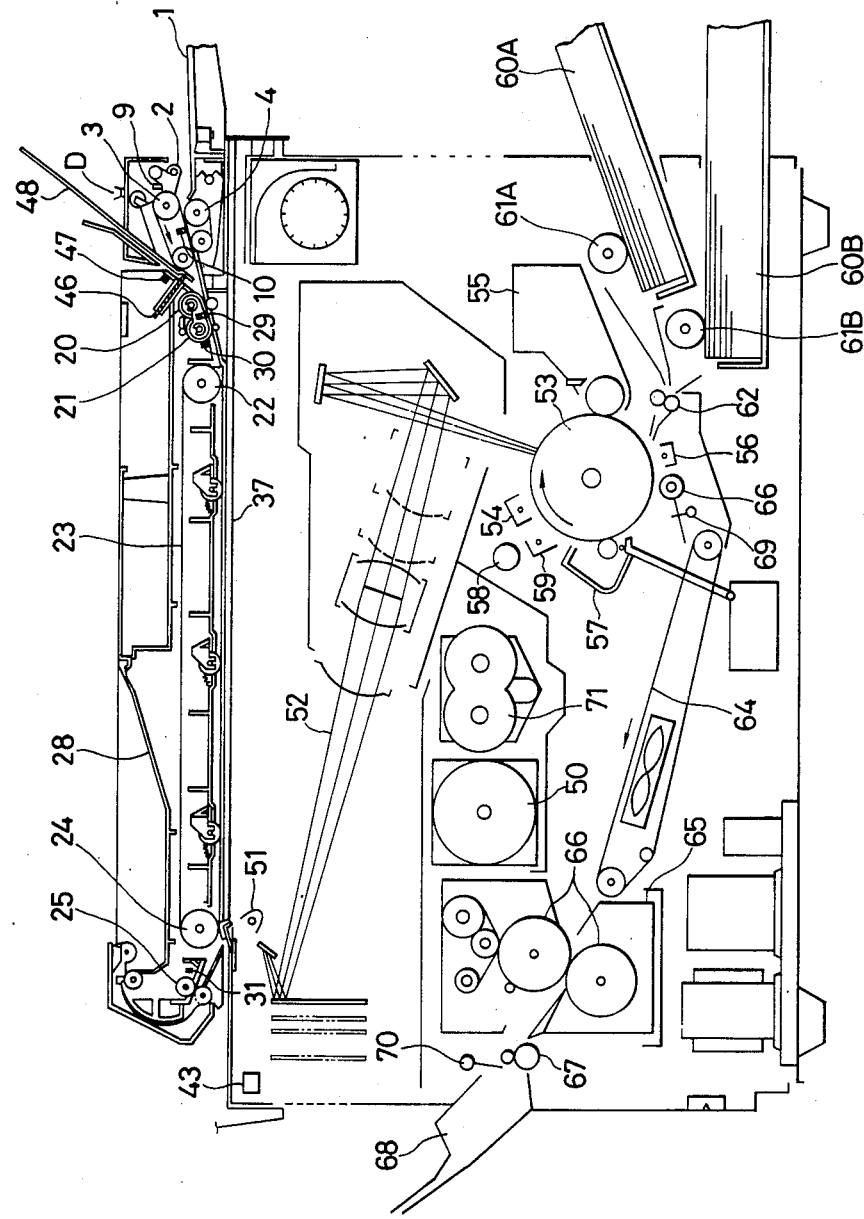
FIG. 2B is a sectional view showing the construction of a copying machine on which an original feeding apparatus is mounted.
Figure 3:
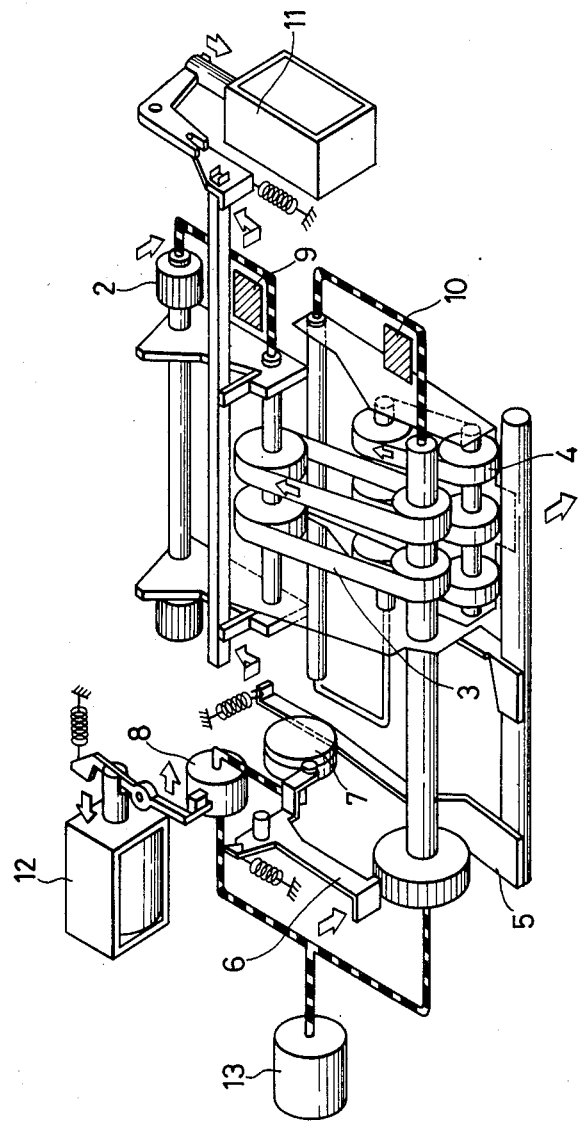
FIG. 3 is a perspective view showing the construction of the AF section.
Figure 4:
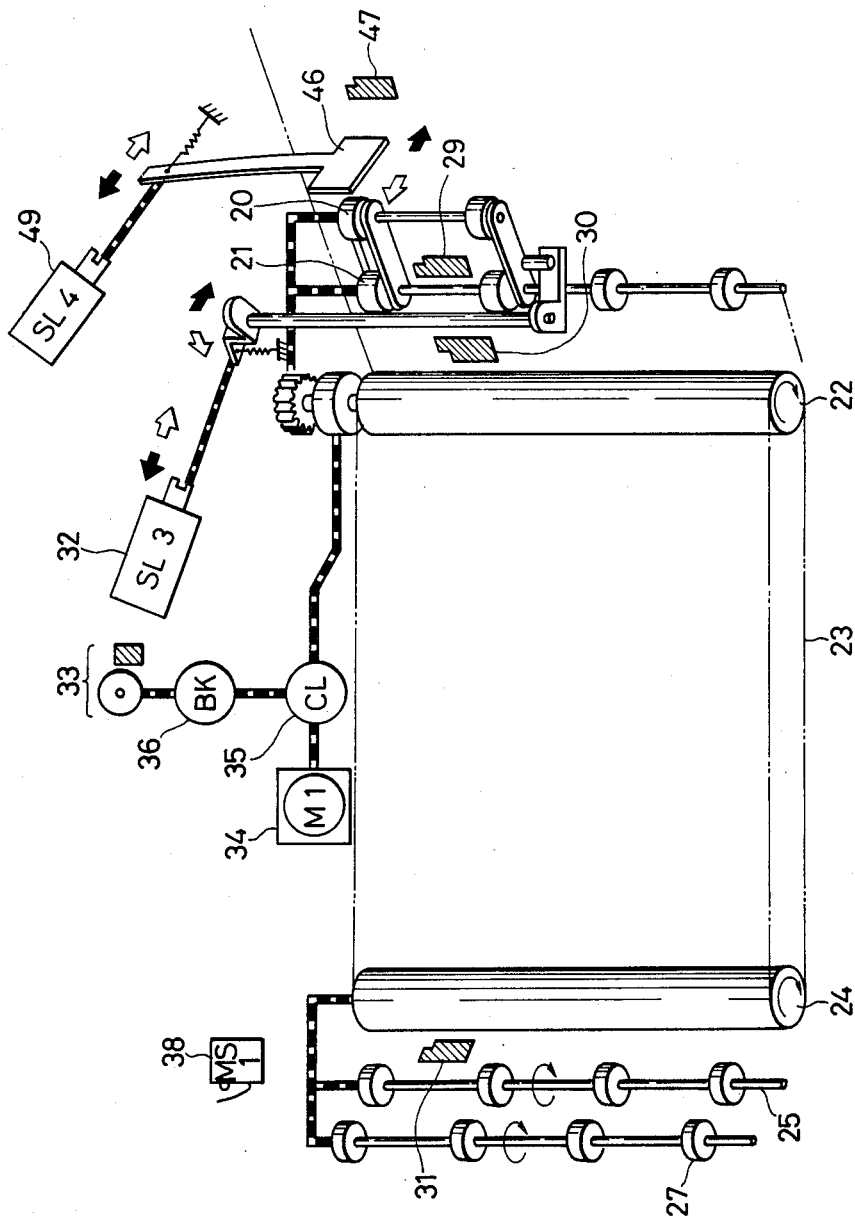
FIG. 4 is a perspective view showing the construction of the DF section.

FIGS. 2A and 2B are sectional views showing the construction of the sections AF and DF, FIG. 3 is a perspective view of the AF section, and FIG. 4 is a perspective view of the DF section.

The construction of the AF section will first be described. Referring to FIG. 2A and 3, an original tray 1 is arranged horizontally, facing the original surface downward. When a pick-up solenoid 11 (SL1) is turned on, a pick-up roller 2 is moved downward and picks up the uppermost original on the original tray 1. When an AF drive motor 13 (M2) is actuated, a clockwise rotational force is transmitted to the pick-up roller 2 through an upper separation belt 3. The upper separation belt 3 and a lower separation belt 4 are separated to convey a single original therebetween. When the AF drive motor 13 (M2) is actuated, the pick-up roller 2 is actuated to pick up a single original.

When the original is fed to the gap between the belts 3 and 4, the solenoid 11 is turned off so that the pick-up roller 2 is moved upward. When the motor 13 rotates, a belt open solenoid 12 (SL2) is turned on. Then, a half rotation control ring 8 is rotated a half rotation, and a cam 7 is rotated. Then, a clutch pawl 6 is moved in the direction indicated by the arrow to stop transmission of the power of the motor 13 to the separation belts 3 and 4. At the same time, a release shaft arm 5 presses the separation belt 4 downward, thereby defining a wider gap between the belts 3 and 4. When the belt open solenoid 12 is turned off while the motor 13 is driven, the half rotation control ring 8 is rotated a half rotation to return the cam 7 to the original position. Then, the clutch pawl 6 is moved upward to transmit the rotation of the motor 13 to the separation belts 3 and 4. At the same time, the release shaft arm 5 is moved upward to move the separation belt 4 upward, thereby returning the gap between the belts 3 and 4 from the wide gap to the original narrow gap.

The drive system in the AF section is common to the pick-up roller 2 and the belts 3 and 4; and so rotation of the drive motor 13 (M2) is transmitted to the respective parts. An AF original sensor 9 (S1) detects that an original is set on the original tray 1. A timing sensor 10 (S2) detects that an original is in the gap between the belts 3 and 4.

An original insertion port 48 is for interrupt copy operations, an interrupt original sensor 47 (S6) detects an interrupt original, and a shutter 46 temporarily prohibits the insertion of the interrupt original into the convey path. When a solenoid 49 (FIG. 4) is actuated, the shutter 46 is moved upward so as to allow the interrupt original to be inserted. When the shutter 46 is turned off, it is moved downward by a return spring so as to stop the interrupt original.

The construction of the DF section will be described hereinafter. Referring to FIGS. 2A, 2B and 4, a holding roller 20 holds the original fed from the AF section. When an original hold solenoid 32 (SL3) is actuated, the holding roller 20 holds the original. A convey roller 21 conveys the original supplied from the AF section.

An entire surface belt 23 is looped around a drive roller 22 and a turn roller 24, and is urged against an original glass platen 37 so as to convey the original with a frictional force. A discharge roller 25 (1) discharges the original which has been exposed on the glass platen 37, and the original is discharged toward a turn section 26 and is stacked on a discharge tray 28 by a discharge roller 27 (2).

A DF original sensor 29 (S3) detects the original supplied from the AF section. An entrance sensor 30 (S4) detects the leading edge or trailing edge of the original. A discharge sensor 31 (S5) detects the discharged original.

The drive system of the DF section is common to all of the holding roller 20, the convey roller 21, the drive roller 22, the turn roller 24, the discharge roller 25 (1), and the discharge roller 27 (2). These rollers rotate at the same peripheral speed, and the rotation of a drive motor 34 (M1) is transmitted to these rollers through a clutch 35 (CL).

A brake 36 (BK) is turned on when the original is set at a predetermined position on the original glass platen 37. The operation of the brake 36 is controlled by a clock generator 33 which is actuated in synchronism with the rotation of the drive motor 34 (M1).

A start switch 39 is arranged in the control portion D. When the start switch 39 is depressed, an internal ADF start indication lamp 41 is turned on, and the original starts to be fed.

An open/close cover 26' of the turn section 26 is pivotal about an axis X. When the cover 26' is opened, the original can be discharged from the discharge roller 25 (to the left in the drawings).

The DF section can be opened or closed with respect to the AF section. A DF door switch (to be described later) comprising a microswitch is arranged to detect the open/closed state of the DF section.

The mode of operation of the ADF having the above construction will now be described. When an original is placed in the original tray 1, the AF original sensor 9 detects the placed original. When the ADF start switch 39 is turned on, the lamp 41 is turned on, and the solenoid 11 is energized. Therefore, the pick-up roller 2 is moved downward. When a predetermined period of time has elapsed after the solenoid 11 has been energized, the AF motor 13 is driven so that the uppermost original on the tray 1 is picked up and conveyed.

When the leading edge of the original being conveyed between the separation belts 3 and 4 is detected by the AF timing sensor 10, current supply to the solenoid 11 is stopped and the pick-up roller 2 is moved upward. The original is thus conveyed from the AF section to the DF section.

When the leading edge of the original is detected by the DF original sensor 29, the solenoid 12 is energized in the AF section to move the separation belt 4 downward. The movement of the belts 3 and 4 is then stopped. When a predetermined period of time has elapsed since the solenoid was energized, the AF section is stopped and the AF section stops operating.

In the DF section, when the DF original sensor 29 detects the leading edge of the original, the solenoid 32 is energized and the holding roller 20 is moved downward to hold the original. When the DF drive motor 34 and the clutch 35 are turned on, the DF holding roller 20, the convey roller 21, the drive roller 22, the turn roller 24, the discharge rollers 25 and 27 are rotated. Thus, the original starts to be fed. When the original passes by the convey roller 21 and the leading edge of the original is detected by the entrance sensor 30, clock pulses from the clock generator 33 start to be counted. When the trailing edge of the original is detected by the sensor 30, the solenoid 32 is deenergized, and the holding roller 20 is moved upward. The original is then guided into the gap between the entire surface belt 23 and the original glass platen 37 and is conveyed by the entire surface belt 23.

When the number of pulses generated by the clock generator 33 reaches a predetermined value, current supply to the DF drive motor 34 and the clutch 35 are stopped. At the same time, the brake 36 is energized. A copy start signal is supplied to the copying machine main body C (FIG. 1), and the copy operation is started.

The brake 36 is then stopped after a predetermined period of time.

During the copy operation at the copying machine main body C, the solenoid 11 is energized in response to a STANDBY signal from the copying machine main body C. The pick-up roller 2 is moved downward, and the next original is separated and conveyed.

When the DF original sensor 29 detects the leading edge of the original, the solenoid 32 is energized, and the holding roller 20 is moved downward. In this state, the ADF temporarily stops operating, and is set in a mode (to be referred to as a STANDBY mode) awaiting the reception of a DF START signal from the copying machine main body C.

When the DF start signal is received from the copying machine main body C after the exposure operation of the last original of the preset number (setting sheet number) of originals to be copied, the original on the original glass platen 37 is discharged onto the discharge tray 28. At the same time, the next original waiting in the STANDBY state is fed (in what is to be referred to as discharge/charge operation) to the reference original position of the original glass platen 37. A COPY START signal is supplied to the copying machine, and the copy operation is resumed.

A timing for supplying the STANDBY signal to the ADF will be described next. A time period required for the ADF to attain the STANDBY mode after separating and conveying the next original on the original tray 1 upon reception of the STANDBY signal is represented by t1. A time period required for the DF start signal to be generated after the STANDBY signal is received is represented by t2. A time period required for a halogen lamp for exposing the original on the original glass plate 37 to be turned on upon reception of the STANDBY signal is represented by t3. Then, the generation timing of the STANDBY signal must satisfy the conditions $t1 \leq t2$ and $t1 \leq t3$. When these conditions are satisfied, the STANDBY operation is performed only during a period in which the halogen lamp for exposing the original on the original glass platen 37 is not lit. Therefore, the time period t1 and the ON time of the halogen time will not coincide with each other. Furthermore, the STANDBY signal is supplied to the ADF before the final exposure operation.

An interrupt original inserted in the insertion port 48 will be described below.

If the copying machine is not performing a copy operation and the next original is not in the STANDBY state (i.e., a time period before the STANDBY signal is received after the ADF has supplied a COPY START signal to the copying machine), when an interrupt original is inserted at the insertion port 48, the interrupt original sensor 47 detects it. When the STANDBY signal is received from the copying machine thereafter, the solenoid 49 is energized, and the shutter 46 is moved upward. Then, the interrupt original is dropped downward and is detected by the DF original sensor 29. The solenoid 32 is energized, the holding roller 20 is moved downward, and the interrupt original is set in the STANDBY state. When a DF start signal is supplied from the copying machine in this state, the discharge/charge operation for the original on the glass platen 37 and the interrupt original is performed.

If the interrupt original is detected by the interrupt original sensor 47 while the next original is in the STANDBY mode, the next original is supplied onto the original glass platen 37 and the interrupt original awaits until a STANDBY signal is supplied from the copying machine during the current copy operation. Upon the above-mentioned operation, the interrupt original is placed in the STANDBY state. At this time, the feeding of the original on the tray 1 of the AF section is prohibited. When the interrupt original is placed on the original glass platen, an interrupt copy start (INT COPY START) signal is supplied from the ADF, and the copying machine performs an interrupt copy operation.

In this manner, when an interrupt original is inserted into the interrupt insertion port 48 during copying a preset number of originals, an interrupt copy start signal is not immediately supplied to the copying machine but is supplied at the same timing as that of the normal COPY START signal. Therefore, the interrupt copy operation will now be performed during the normal copy operation.

The construction and operation of the copying machine will be described briefly. When a COPY START signal is received from the ADF in the manner as described above, a drive motor 50 starts to be rotated, and an exposure lamp 51 is turned on to expose the original set at a predetermined position (exposure position) on the glass platen 37. Reflected light forms an image on a photosensitive drum 53, rotating in a direction indicated by the arrow, through an optical system 52. The photosensitive drum 53 has been positively or negatively charged by a charger 54. Therefore, an electrostatic latent image corresponding to the original image is formed on the photosensitive drum 53, developed by a developing unit 55, and transferred to a copying sheet by a transfer charger 56. The residual toner on the photosensitive drum 53 is cleaned by a cleaning unit 57, and the drum 53 is charge-removed by an eraser lamp 58 and a charge remover 59.

The copying sheets are picked up one by one by pick-up rollers 61A and 61B from cassettes 60A and 60B. The picked-up sheet is supplied onto the photosensitive drum 53 through resist rollers 62. A toner image is transferred onto the sheet, and the sheet is separated from the drum 53 by a separation roller 66. After being conveyed by a convey belt 64, the sheet is fixed by fixing rollers 66 of a fixing unit 65 and is then discharged to a discharge tray 68.

A separation jam sensor 69 and a discharge jam sensor 70 perform jam detection so as to monitor the convey state of the copy sheet. A forward/backward clutch 71 moves the exposure lamp 51 and other reflecting mirrors and lenses, thereby constituting the optical system 52 for exposing the original on the glass platen 37.

Figure 5:
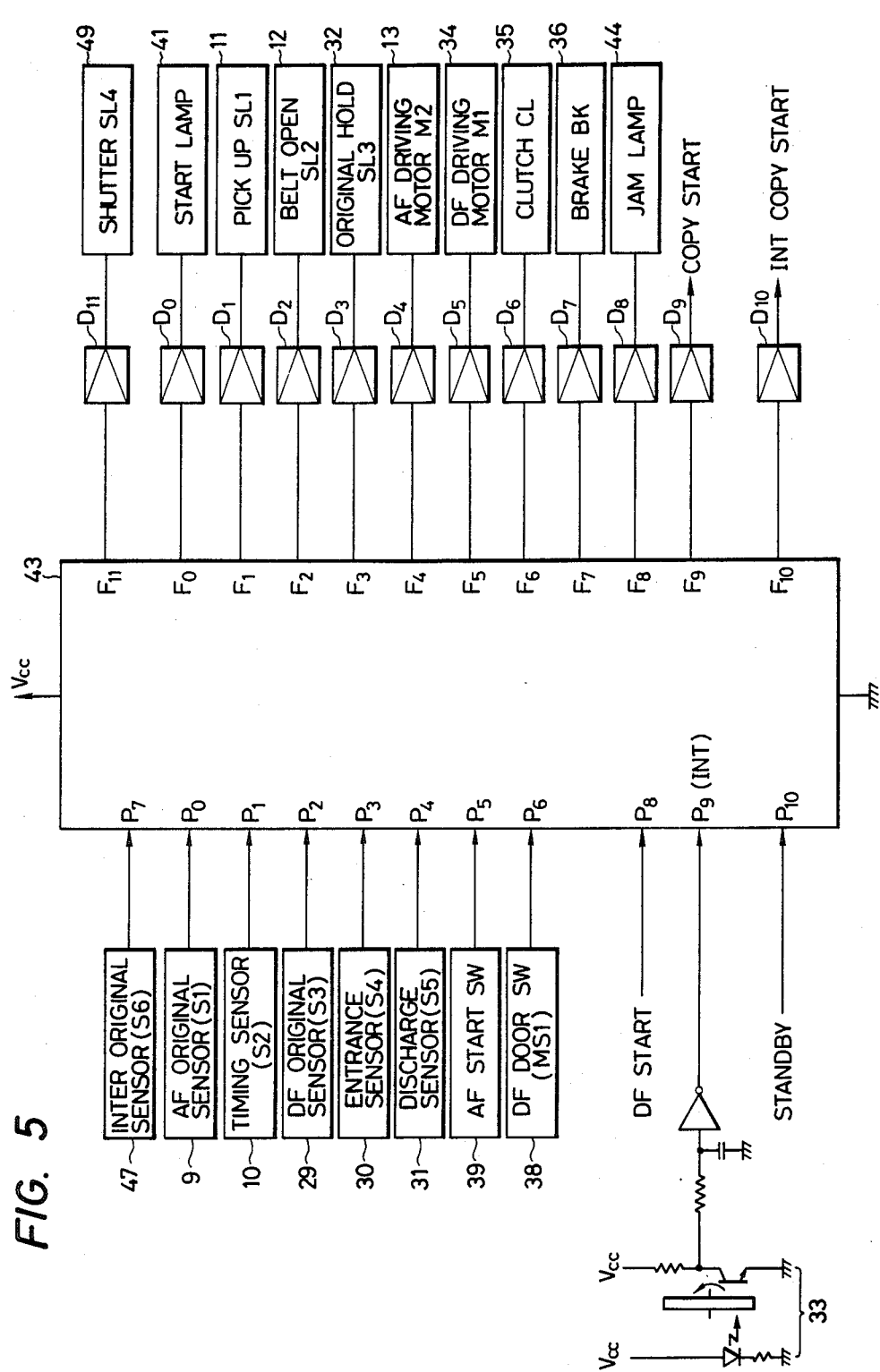
FIG. 5 is a block diagram showing the control section of the original feeding apparatus.

FIG. 5 is a block diagram of the control section for controlling the operation of the ADF. The control section mainly comprises a known one-chip microcomputer (to be referred to as μCOM hereinafter) 43 incorporating ROMs and RAMs. An interrupt terminal P9 (INT) of the μCOM 43 receives, after waveform shaping by a capacitor, a pulse signal from the clock generator 33 upon rotation of the DF drive motor 34. Input ports P0 to P4 receive original detection signals from the AF original sensor 9 (S1), the timing sensor 10 (S2), the DF original sensor 29 (S3), the entrance sensor 30 (S4), and the discharge sensor 31 (S5) An input port P5 receives a signal from the ADF start switch 39. An input port P6 receives a state detection signal from a microswitch 38 (MS1) operative in response to the open/close operation of the DF section. An input port P7 receives an original detection signal from the interrupt original sensor 47 (S6). A DF start signal DFSTART from the copying machine is received at an input port P8. This signal is generated when the last exposure operation is completed at the copying machine. An input port P10 receives from the copying machine a STANDBY signal for setting the ADF in the STANDBY mode.

An output port F0 supplies, through a driver D0, an ON signal for the lamp 41 in response to an input signal received at the input port P5. Output ports F1 to F3 and F11 supply through drivers D1 to D3 and D11, respectively, drive control signals for driving the pick-up solenoid 11, the belt open solenoid 12, the original hold solenoid 32, and the shutter solenoid 49. Output ports F4 to F7 supply, through drivers D4 to D7, drive control signals to the AF drive motor 13 (M2), the DF drive motor (M1), the clutch 35 and the brake 36. An output port F8 supplies an ON signal to a jam indication lamp 44 in the control portion D through a driver D8. Output ports F9 and F10 supply a COPY START signal and an INT COPY START signal to the copying machine through drivers D9 and D10, respectively.

The read-in of these signals and turn ON/OFF operations of the loads are controlled in accordance with a program stored in the ROM in the μCOM 43.

A similar control section to that shown in FIG. 5 is also assembled in the copying machine and supplies a DFSTART signal to the ADF and receives the COPY START signal and the INT COPY START signal.

Figure 6:
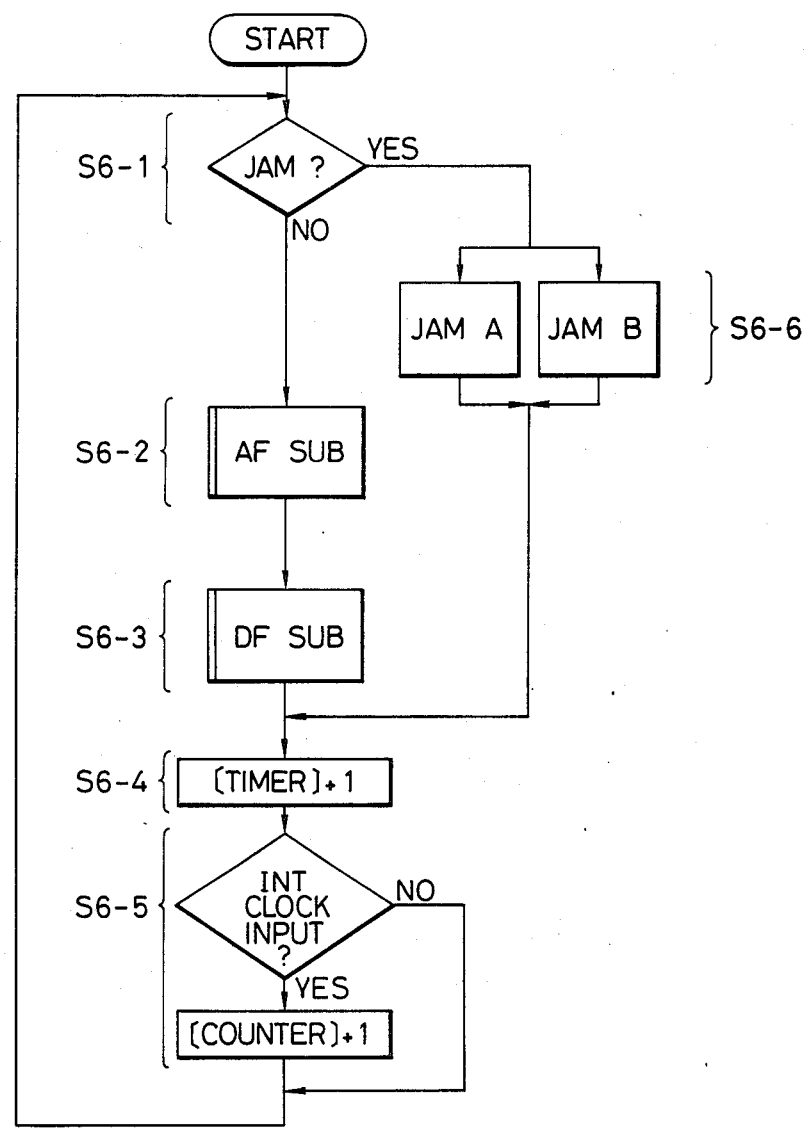
FIGS. 6 to 11 are flow charts of the program stored in a microcomputer shown in FIG. 5.

FIG. 6 is a flow chart showing the main routine.

In step S6-1, it is checked or discriminated if jamming or a jam has occurred. If NO in step S6-1, the AF subroutine is executed in step S6-2 (FIG. 7) and thereafter the DF subroutine (FIG. 8) is executed in step S6-3.

In step S6-4, the content of a timer to be described later is incremented by one.

In step S6-5, the content of a counter to be described later is incremented by one when the clock pulse is received at an interrupt terminal INT.

However, when YES in step S6-1, a JAM A or JAM B routine is executed in step S6-6 and the flow advances to step S6-4 thereafter.

The JAM A routine is a routine to be executed when a clogging jam has occurred and is for stopping all the loads of the ADF. First, the original is removed from the sensor position. When the sensor is thus placed from the original detecting state to the original non-detecting state, a jam reset is performed.

The JAM B routine is executed when a delay jam has occurred and is also for stopping all the loads of the ADF. The DF door is opened or closed to turn on or off the start switch 39 (MS1). Then, a jam reset is performed.

In this embodiment, when the input signal waiting state is achieved during the execution of the AF subroutine, the flow returns to the main routine.

Figure 7A:
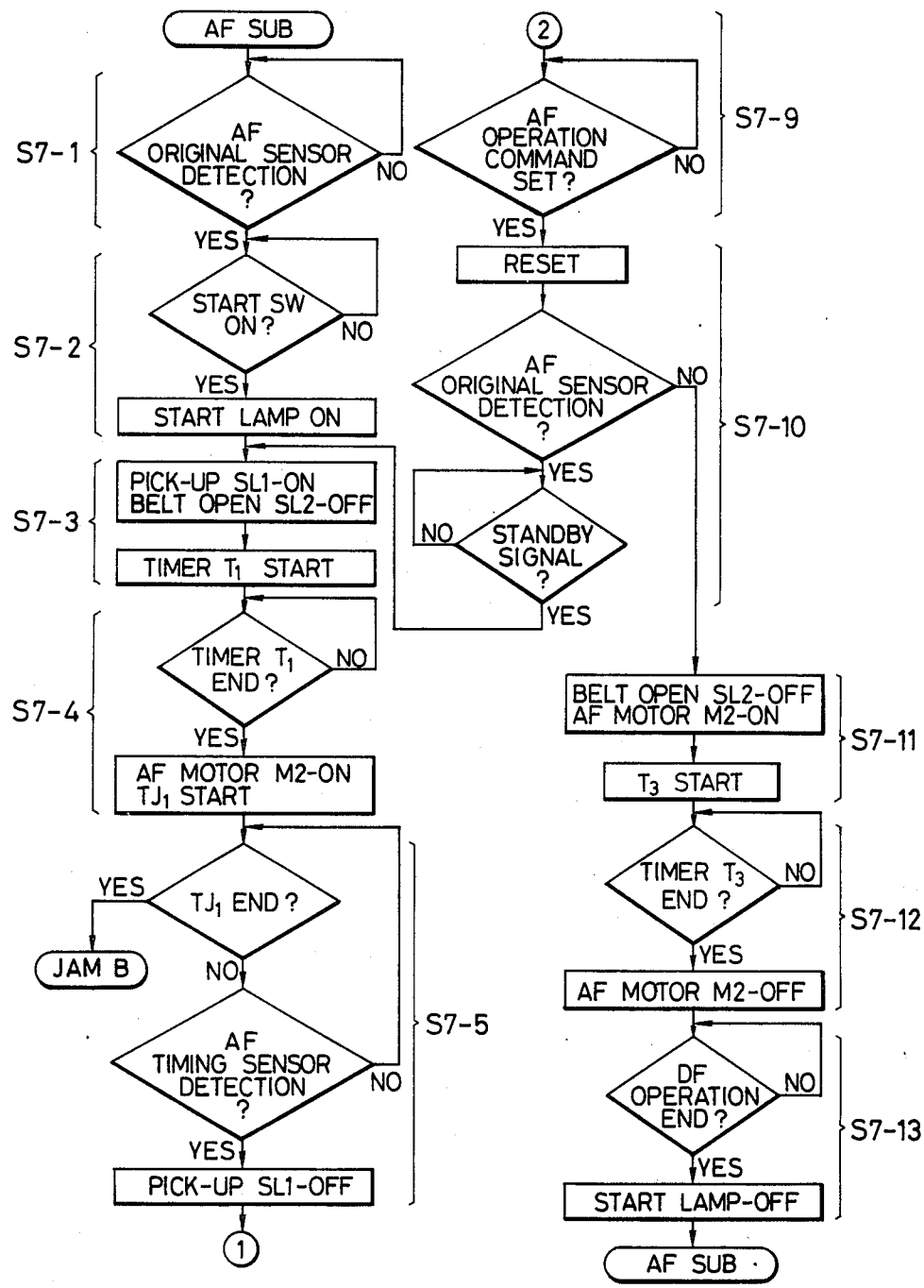
Figure 7B:
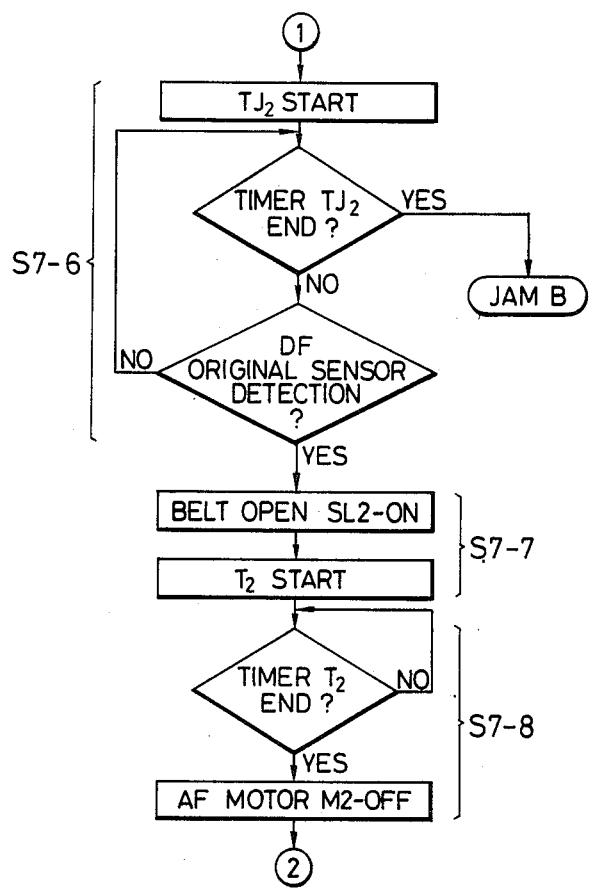

The AF subroutine will be described with reference to FIG. 7.

In step S7-1, the original is placed on the original tray 1, and it is checked if the original is detected by the AF original sensor 9 through the input port P0. This step is repeated until YES is obtained.

When the original is detected (YES in step S7-1), the flow advances to step S7-2 to check if the start switch 39 is ON through the input port P5. This step is repeated until YES is obtained. When YES is obtained in step S7-2, a lamp ON signal is produced from the output port F0. Thus, the lamp 41 is turned on to signal to the operator that the ADF has started to operate.

In step S7-3, the pick-up solenoid 11 is turned on and the belt open solenoid 12 is turned off by the signals from the output ports F1 and F2. Thus, the original starts to be fed. A pick-up holding timer T1 allocated in a predetermined area of the RAM of the μCOM 43 is started to count a predetermined period of time.

In step S7-4, it is checked if the timer T1 is ended. When YES in step S7-4, the AF drive motor 13 is turned on. The time preset in the timer T1 is an interval wherein the pick-up roller 2 is dropped by its own weight upon turning of of the pick-up solenoid 11, is urged against the original surface, and the original is fed upon turning on of the AF drive motor 13. When this counter T1 is not used, when the pick-up roller 2 is moved to be in contact with the surface of the original, it immediately starts feeding the original. Then, this may lead to a ramp in the original or double feeding. When the timer T1 ends, a pick-up delay JAM timer TJ1 is started.

In step S7-5, the AF timing sensor 10 is monitored until the timer TJ1 is ended. When the AF timing sensor 10 does not detect the original before the counter TJ1 ends, it is determined that an erroneous pick-up has occurred. Then, a pick-up delay JAM is determined and the JAM B routine is performed. However, if the AF timing sensor 10 detects the original, it is determined that the original pick-up has been performed normally. Then, the pick-up solenoid 11 is turned off, and the pick-up roller 2 is moved upward.

When the AF timing sensor 10 detects the original, the original is at the gap between the upper and lower separation belts 3 and 4. Since the original is fed by the upper separation belt 3, convey by the pick-up roller 2 is not necessary. Therefore, the pick-up roller 2 is removed from the original surface. The lower separation belt 4 also prevents double feeding of the originals. In this manner, the pick-up roller 2 picks up only an uppermost original. Even if the pick-up roller 2 picks up two originals, the lower original is driven in the opposite direction and will not be conveyed together with the upper original. If the pick-up roller 2 is at the lower position when the separation belt 4 is driven, it prevents smooth operation of the belt 4. Therefore, the pick-up roller 2 is removed from the original surface.

In step S7-6, an AF clogging JAM timer TJ2 is started when the AF timing sensor 10 normally detects the original. The DF original sensor 29 is monitored until the timer TJ2 ends. If the DF original sensor 29 has not detected the original before the timer TJ2 ends, it is determined that separation has been unsuccessful and the original is clogged to cause an AF clogging jam. In this case, the flow advances to the JAM B routine. However, when the DF original sensor 29 has detected the original, it is determined that separation has been performed normally, and the flow advances to the next step.

In step S7-7, the belt open solenoid 12 is turned on to open the belts and to stop the original convey in the AF section when the DF original sensor 29 normally detects the original. As will be described later, the DF original sensor 29 is turned on to start control of the operation of the DF section. At this timing, a belt open timer T2 is started.

In step S7-8, it is checked if the timer T2 has ended. When YES in step S7-8, the AF drive motor 13 is driven to lower the lower separation belt 4 so as to widen the gap between the belts 3 and 4 and so prevent the convey operation of the DF section to be described later. The preset time in the timer T2 is sufficient for allowing the separation belts 3 and 4 to be sufficiently spaced apart from each other. When the timer T2 ends, the AF drive motor 13 is turned off and the flow goes to the next step.

In step S7-9, it is checked if the AF operation command is set. When YES in step S7-9, the next AF operation is started.

In step S7-10, the AF operation command is reset and it is checked if the AF original sensor 9 has detected the original, i.e., if the next original is placed on the original tray 1. If the original has been detected by the AF original sensor 9, the flow advances to step S7-3 after the STANDBY signal is supplied from the copying machine.

In step S7-3, the belt open solenoid 12 is turned off so as to close the separation belt 4 which was opened in step S7-8. In step S7-4, the AF drive motor 13 is turned on so as to move the separation belt 4 upward before the next original reaches the position of the belts 3 and 4. Thus, the convey of the next original by the separation belts 3 and 4 can be performed smoothly.

When it is determined in step S7-10 that the AF original sensor 9 has not detected the original, the belt open solenoid 12 is turned off, the now stopped AF drive motor 13 is turned on, and a belt close timer T3 is started, in step S7-11.

In step S7-12, when the timer T3 ends, the AF drive motor 13 is turned off. Then, the separation belt 4 is returned to the original position to close the belts 3 and 4. In this state, the operation of the AF section is terminated.

In the next step, S7-13, after the operation of the DF section ends (i.e., the original conveyed to the DF section is normally placed on the original glass platen 37, the preset number of copies are copied by the copying machine, and the original is discharged from the DF section), the lamp 41 is turned off to signal to the operator that the ADF operation has been completed. Then, the flow returns to START (initial state) and waits in step S7.

Figure 8A:
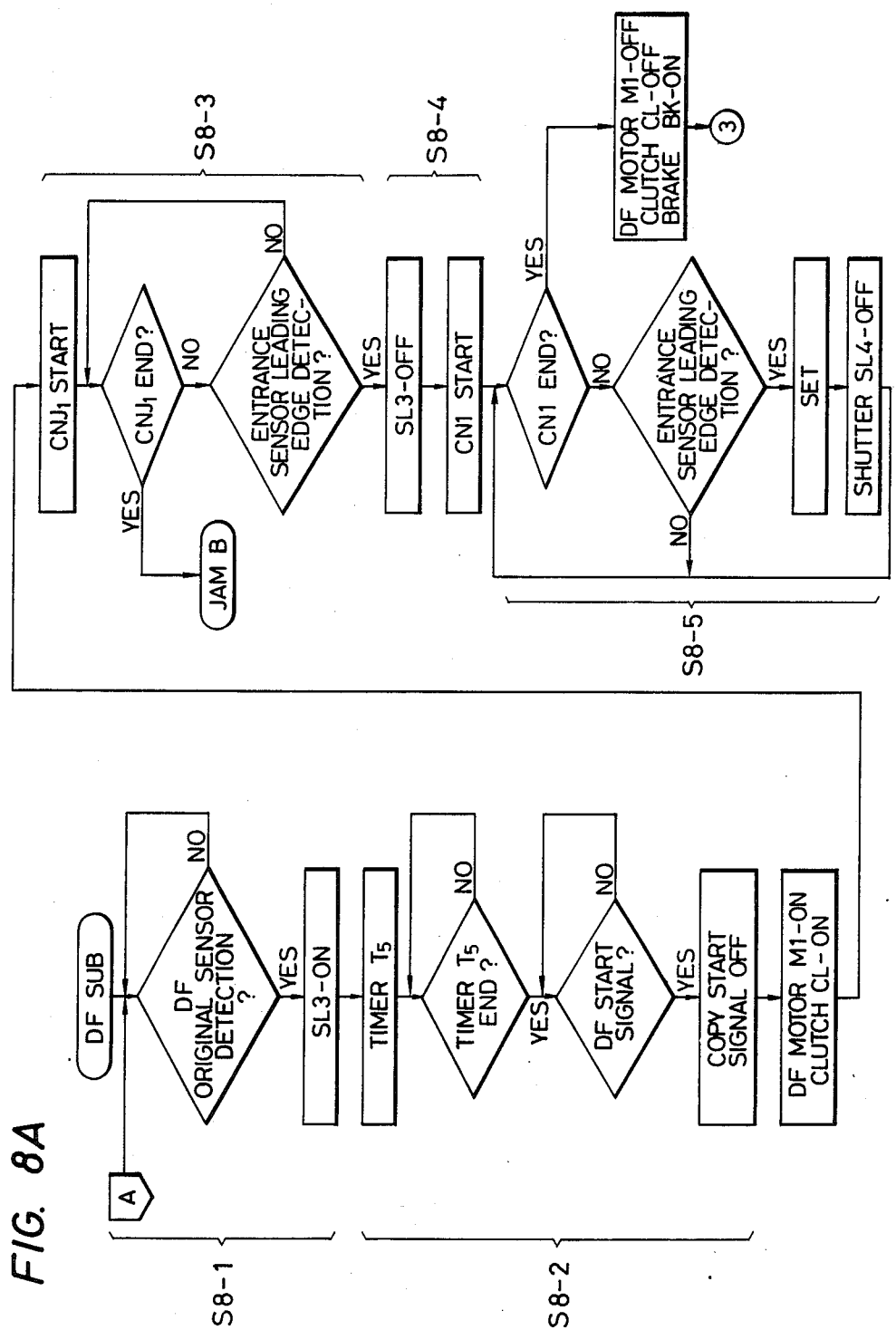
Figure 8B:
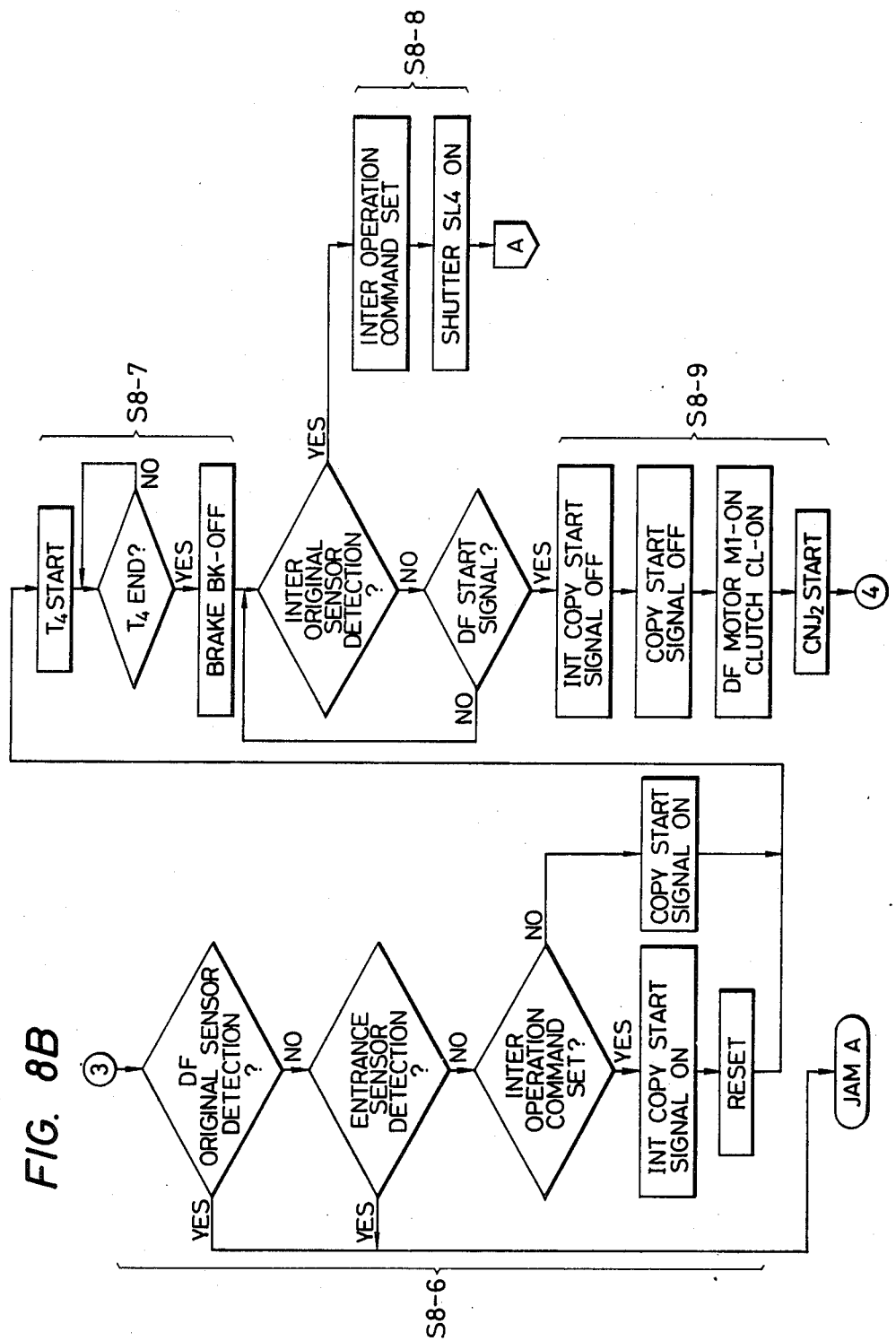
Figure 8C:
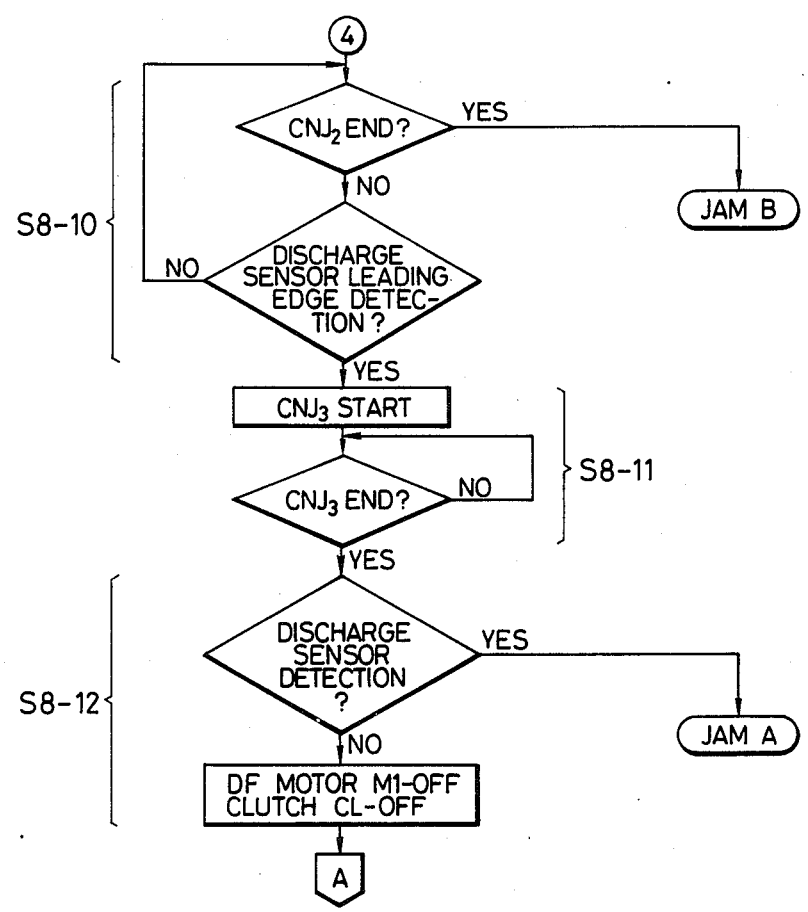

FIGS. 8A and 8B are flow charts showing the DF subroutine.

In step S8-1, when the DF original sensor 29 is turned on by the original conveyed from the AF section, the DF section is started. The original hold selenoid 32 is turned on to hold the original.

In step S8-2, an original hold timer T5 is started. When it is determined that the timer T5 has ended, the input port P8 is checked to monitor if the DF start signal has been received. The DF START signal is produced when the copy operation of the copying machine is completed. Thus, the DF START signal is normally produced from the copying machine excluding the duration of the copy operation period.

When the DF START signal is received, the COPY START signal being supplied from the output port F9 to the copying machine main body is turned off. The DF drive motor 34 and the clutch 35 are turned on so as to drive the entire surface belt 23, the original holding roller 20, and the convey roller 21. The original is thus conveyed. At the same time, clocks synchronous with the convey speed are generated by the clock generator 33 and are supplied to the interrupt terminal INT of the μCOM 43. The clocks received in this manner increment counters (to be described later) allocated at predetermined areas of the RAM of the μCOM 43.

In step S8-3, a convey delay JAM counter CNJ1 is started and it is checked if the entrance sensor 30 has detected the leading edge of the original until the counter CNJ1 ends counting. When the entrance sensor 30 has not detected the original before the timer CHJ1 ends, it is determined that a convey error has occurred and a convey delay JAM is determined. Thus, the flow advances to the JAM B routine. However, when the leading edge of the original has been detected by the entrance sensor 30, the flow advances to the next step.

When the leading edge of the original is detected by the entrance sensor 30, the original hold solenoid 32 is turned off in step S8-4. At this time, the original is provided with a convey force from the convey roller 21 so as to move the holding roller 20 upward so that the original convey by the convey roller 21 and the entire surface belt 23 is not interfered with.

In order to stop the original at a predetermined position on the original glass platen 37, an original set counter CN1 is started after the leading edge of the original has been detected by the entrance sensor 30.

In step S8-5, the trailing edge of the original is monitored by the entrance sensor 30 until the counter CN1 ends. When the entrance sensor 30 detects the trailing edge of the original, that is, when the original detection signal from the entrance sensor 30 is turned off, the interrupt original shutter solenoid 49 to be described later is turned off to set the AF operation command, thereby commanding the AF operation as described above. Then, the AF section performs the operation of step S7-9 and thereafter to start feeding the next original. When the counter CN1 ends, that is, when the original has reached the predetermined position (exposure position) on the original glass platen 37, the DF drive motor 34 and the clutch 35 are turned off. In order to obtain a higher precision, the brake 36 is turned on to stop the entire surface belt 23. At this time, the original has not reached the DF section.

In step S8-6, when the counter CN1 ends, it is checked if the original has been detected by the DF original sensor 29 and the entrance sensor 30. If YES, a convey clogging JAM is determined and the flow advances to the JAM A routine. However, if NO, an interrupt operation command to be described later is checked. If the command has been already set, the INT COPY START signal is supplied to the copying machine to reset the interrupt operation command. However, if the command has not been set, the COPY START signal is supplied to the copying machine. Thus, the copying machine starts the interrupt or copy operation.

In step S8-7, a brake ON timer T4 is started and an end of the timer T4 is monitored. When the timer T4 ends, the brake 36 is turned off.

In step S8-8, it is alternately checked if the interrupt original sensor 47 has detected the original and whether the DF START signal is produced from the copying machine. When the interrupt original has been detected, the interrupt operation command is set. The interrupt original shutter solenoid 49 is turned on and the flow returns to step S8-1. When the DF START signal is produced, the flow advances to step S8-9. The INT COPY START signal and the COPY START signal are turned off, the DF drive motor 34 and the clutch 35 are turned on, and the original starts to be conveyed onto the discharge path from the original glass platen 37. A discharge delay JAM counter CNJ2 is started.

In step S8-10, until the counter CNJ2 ends, it is checked if the leading edge of the original has been detected by the discharge sensor 31. If the leading edge has not detected, a discharge delay JAM is determined and the flow advances to the JAM B routine. If the leading edge has been detected, it is determined that the discharge operation has been performed normally and the flow advances to the next step.

In step S8-11, a discharge clogging JAM counter CHJ3 is started and an end of the counter CNJ3 is monitored. When the counter CNJ3 ends, the flow advances to the next step. The preset time in the counter CNJ3 is preset to provide a sufficient time period for the discharge of the trailing edge of the original by the discharge roller 27 (2) after the leading edge of the original has been detected by the discharge sensor 31.

In step S8-12, after the counter CNJ3 has ended, the trailing edge of the original is detected by the discharge sensor 31. When the trailing edge is detected, a discharge clogging JAM is determined and the flow advances to the JAM A routine. However, when the trailing edge is not detected, it is determined that the original has been normally discharged. Then, the DF drive motor 34 and the clutch 35 are turned off, and the flow returns to step S8-1.

Figure 9:
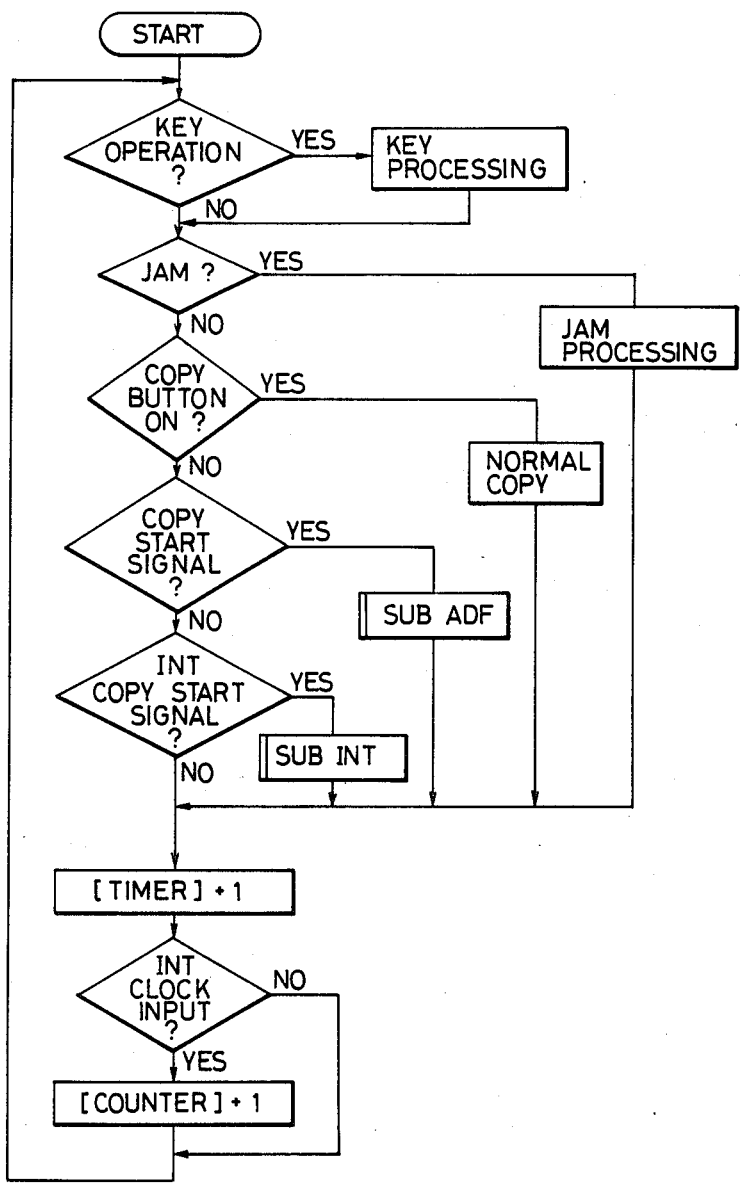

FIG. 9 is a main routine showing the operation of the copying machine.

It is first checked if a key of a control panel E (FIG. 1) has been depressed. If YES, a KEY processing program (e.g., presetting of the setting sheet number) is executed. Next, the following states are checked: if a jam has occurred in the copying machine, the copy button at the control panel E (FIG. 1) is depressed, the COPY START signal is received from the ADF, the INT COPY START signal is received from the ADF and the like. In the respective cases, the JAM processing program, the normal copy program, the SUB ADF program, and the SUB INT program are executed.

The SUB ADF program and the SUB INT program described above will be described below. The timings of generating the STANDBY signal and the DF START signal after the COPY START signal or the INT COPY START signal has been received from the ADF will be described below.

Figure 10:
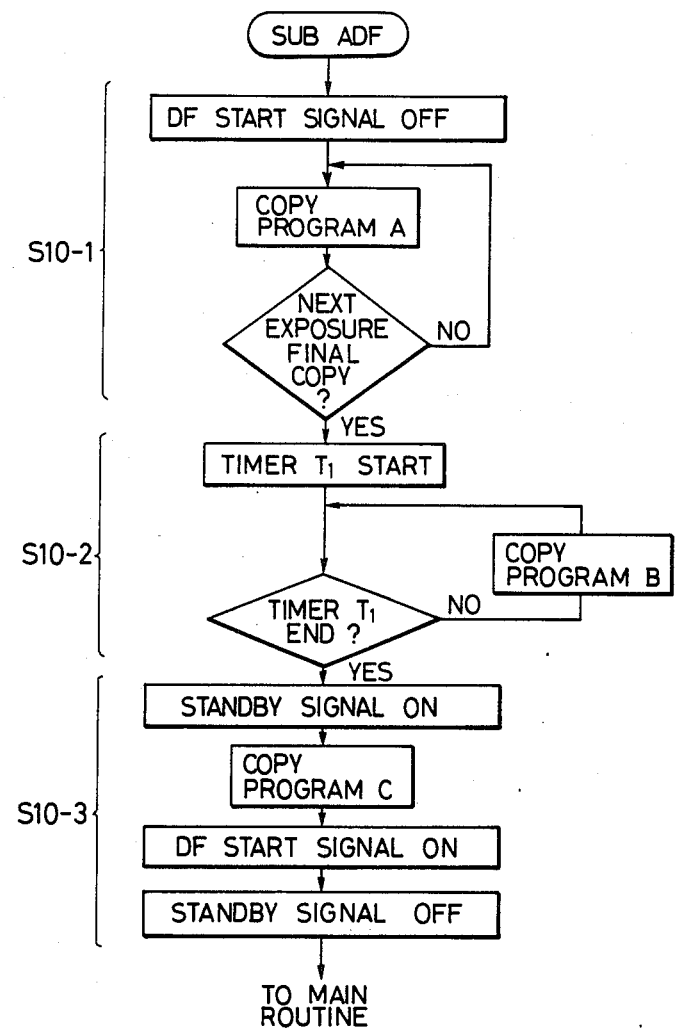

FIG. 10 shows the flow chart of the SUB ADF program in the normal copy operation.

In step S10-1, the DF START signal supplied to the ADF is turned off, and a copy program A is executed while it is checked if the next original exposure is the last one for the setting sheet number. If NO, the flow returns to the start. However, if YES, the flow advances to the next step. When the copy program A is executed, the copy operation for up to the last but one sheet is performed. When the exposure operation for the last but one sheet is completed, and the optical system has reached the inverting position, the flow advances to step S10-2. In step S10-2, the timer T1 for counting the time before the STANDBY signal is generated is started. While a copy program B is executed, the end of the timer T1 is monitored. When the timer T1 ends, the flow advances to the next step. When the copy program B is executed, the exposure lamp is turned off, and the copy sequence within the timer T1 time is performed.

In step S10-3, the STANDBY signal is turned on to execute a copy program C. When the time period t1 has elapsed, the exposure lamp is turned on to perform the last exposure operation. Thereafter, the DF START signal is turned on, the STANDBY signal is turned off, and the flow returns to the main routine. Although the copy programs A, B and C are separate from each other in the flow charts, they are programmed such that they can be performed simultaneously.

Figure 11:
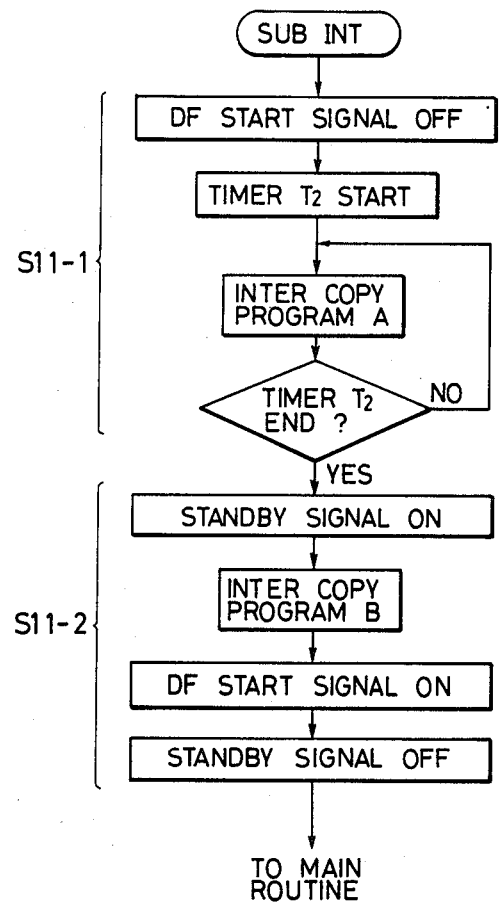

FIG. 11 shows the SUB INT program in the interrupt copy from the ADF.

In step S11-1, the DF START signal supplied to the ADF is turned off. The timer T2 for counting the time until the generation of the STANDBY signal to the ADF in the interrupt copy operation is started. The flow then advances to an interrupt copy program A.

In the interrupt copy program A, the setting sheet number is set to 1. The end of the timer T2 is awaited while the interrupt copy program A is executed. When the timer T2 ends, the flow advances to the next step. When the interrupt copy program A is executed, the exposure lamp 51 is turned off, and the sheet is supplied from the cassette 60A or 60B.

In step S11-2, the STANDBY signal to the ADF is turned on, and an interrupt copy program B is performed. After the time period t1 for completing the STANDBY has elapsed, the exposure lamp 51 is turned on and the optical system is moved in the forward direction to perform the interrupt copy operation. Thereafter, the DF START signal is turned on, the STANDBY signal is turned off, and the flow returns to the main routine.

Figure 12:
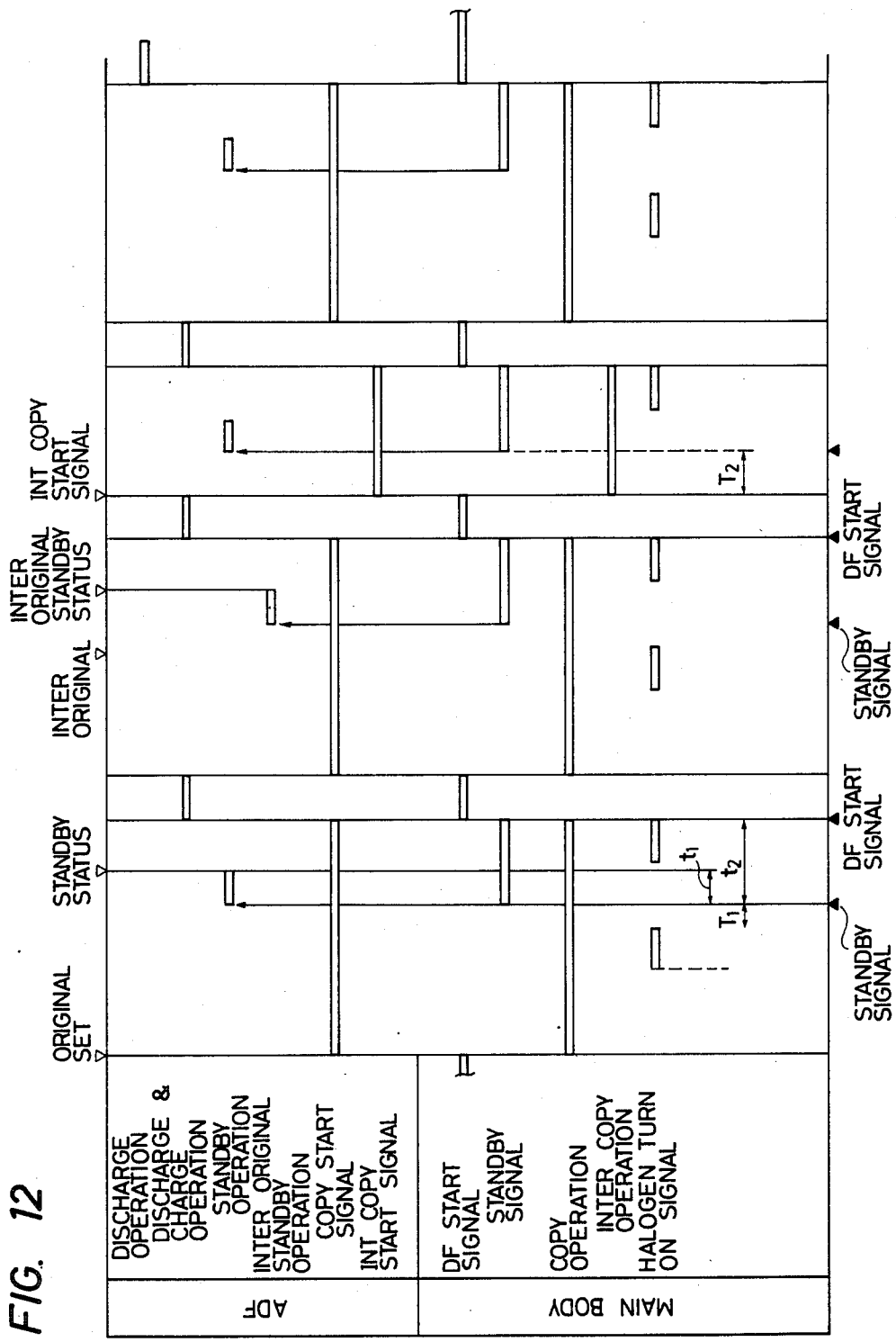
FIG. 12 is a timing chart showing the operation timings of the respective parts in an interrupt copy operation.

FIG. 12 is a timing chart showing the operation in the interrupt copy operation. The upper portion of FIG. 12 relates to the operation of the ADF, while the lower portion relates to the operation of the copying machine main body. Each operation is apparent from this chart and will not therefore be described.

In this manner, according to the present invention, a special original insertion port is arranged in addition to the normal original trays so as to allow insertion of an interrupt original therethrough. Thus, an interrupt copy operation can be performed fast without requiring the operation of the system to be stopped. A user who has been reluctant to use the interrupt function of a conventional copying machine can easily perform the interrupt copy operation in the system of the present invention. Therefore, the system can be utilized with high efficiency When the user inserts an interrupt original through the interrupt insertion port during the copy operation using the ADF, the interrupt copy command is received only after the preset number of sheets have been copied. Therefore, the first user need not perform the return operation of the originals. As a result, the interrupting user can perform an interrupt operation at any time without worrying about disturbing the first user. The copying system with an ADF can therefore be utilized at high efficiency.

Since the separation command can be supplied at a timing such that the separation of the next original and the exposure of the previous original do not overlap, an image forming apparatus can be designed neglecting the restrains on power consumption, due to this separation which spreads out the power consumption of the apparatus. This allows easy design and supply of image forming apparatus to the market.

In the above embodiment, the original insertion port 48 is used for allowing insertion of the interrupt original. However, such a port can also be used for insertion of return originals for jam recovery.

An embodiment having such a feature will be described below.

Figure 13:
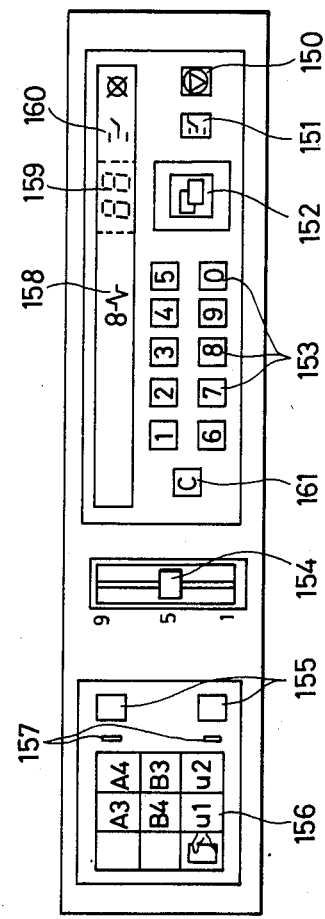
FIG. 13 is a plan view showing a control panel of the copying machine.

FIG. 13 is a plan view showing an example of a configuration of a control panel of a copying machine main body C. A cassette selection key 155 is used to select an upper cassette 60A or a lower cassette 60B (FIG. 2B). A slider lever 154 is used to preset the copy density. A position corresponding to numeral "5" is the standard density. Numeral keys 153 are used for presetting the setting sheet number to be produced. A clear key 161 is used to clear a number which is input by the numeral keys 153. An interrupt key 151 requests an interrupt to the copying machine and allows another copy operation. A copy key 152 commands start of a copy operation. A stop key 150 is used to stop the copy operation during a continuous copy operation of a setting sheet number.

Indicators 157 indicate which one of the cassettes 60A and 60B has been selected by the cassette selection key 155. An indicator 156 indicates the type of the selected cassette. A jam indicator 158 indicates when a jam has occurred in the copying machine main body C. A setting sheet number display 159 displays the setting sheet number. When the setting sheet number is preset by the numeral keys 153, it is indicated by 7-segments. The number of jam sheets in the copying machine main body C or the number of return sheets in the ADF can also be indicated. An interrupt indicator 160 is lit when the interrupt key 151 is depressed. The interrupt indicator 160 is turned off when the interrupt copy operation is completed.

Figure 14:
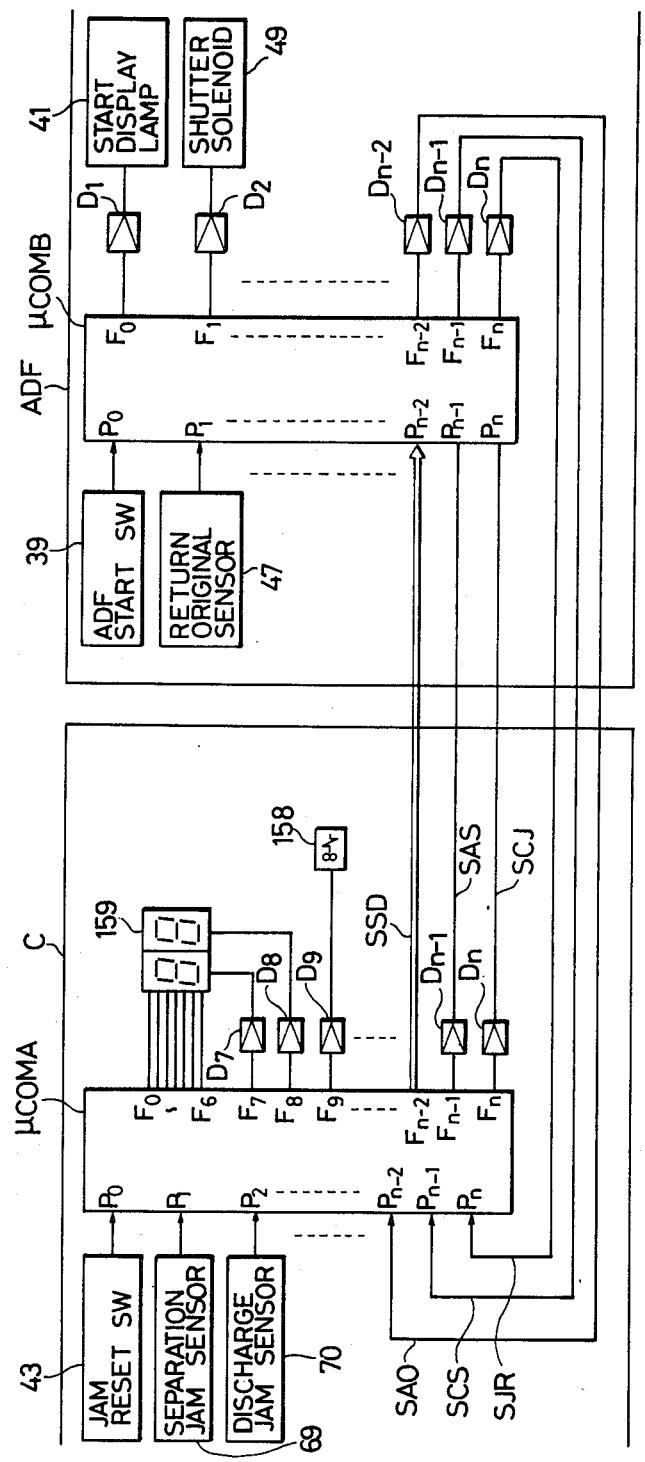
FIG. 14 is a block diagram showing the control section of the original feeding apparatus and the copying machine.

FIG. 14 shows an example of the configuration for performing the operation sequence in FIGS. 15 to 18 according to the present invention. FIG. 14 shows the control section in the copying machine main body C and the control section in the ADF. The control section in the copying machine main body C has a known one-chip microcomputer (to be referred to as a μCOMA hereinafter) having a ROM and a RAM. Input ports P0 to Pn receive the signals from a jam reset switch 43, a separation jam sensor 69, a discharge jam sensor 70 and other input switches, an ADF operation signal SAO from the ADF, a copy start signal SCS, and a jam reset signal SJR. Output ports F0 to Fn of the μCOMA supply data signals of the setting sheet number display 159, drive signals to the display 159 through drivers D7 and D8, a jam indication signal to the jam indicator 158 through a driver D9, a return original number data signal SSD representing the number of return originals to the ADF, an ADF start signal SAS to the ADF through a driver D(n-1), and a main body jam signal SCJ to the ADF through a driver Dn.

The control section of the ADF also has a microcomputer μCOMB similar to the μCOMA. Input ports P0 to Pn of the μCOMB receive the signals from the AF start switch 39 and the interrupt original sensor 47 for detecting the return originals, and, from the copying machine main body C, the return original number data signal SSD, the ADF start signal SAS, and the main body jam signal SCJ. Output ports F0 to Fn of the μCOMB supply a signal to an ADF start display lamp 41 through a driver D1, a drive signal for an interrupt original shutter solenoid 49 for driving a shutter 46 for preventing the return originals from entering the DF section through a driver D2, other output load signals, and, to the copying machine main body C, the ADF operation signal SAO, the copy start signal SCS, and the jam reset signal SJR. Read-in and output of these signals are controlled in accordance with the programs stored in the μCOMA and μCOMB.

FIGS. 15 to 18 show the operation sequence in the control sections shown in FIG. 14.

Figure 15A:
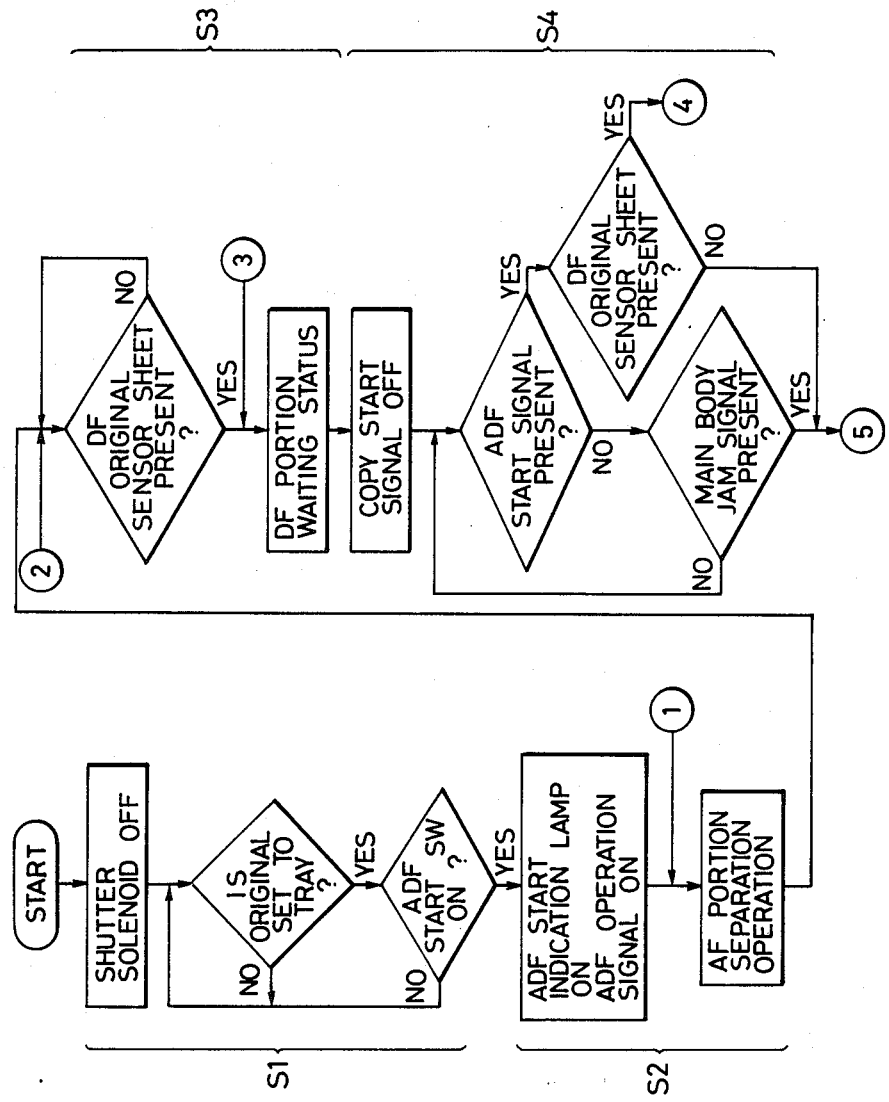
FIGS. 15 to 19 are flow charts of the programs stored in the microcomputers $\mu$COMA and $\mu$COMB shown in FIG. 14.
Figure 15B:
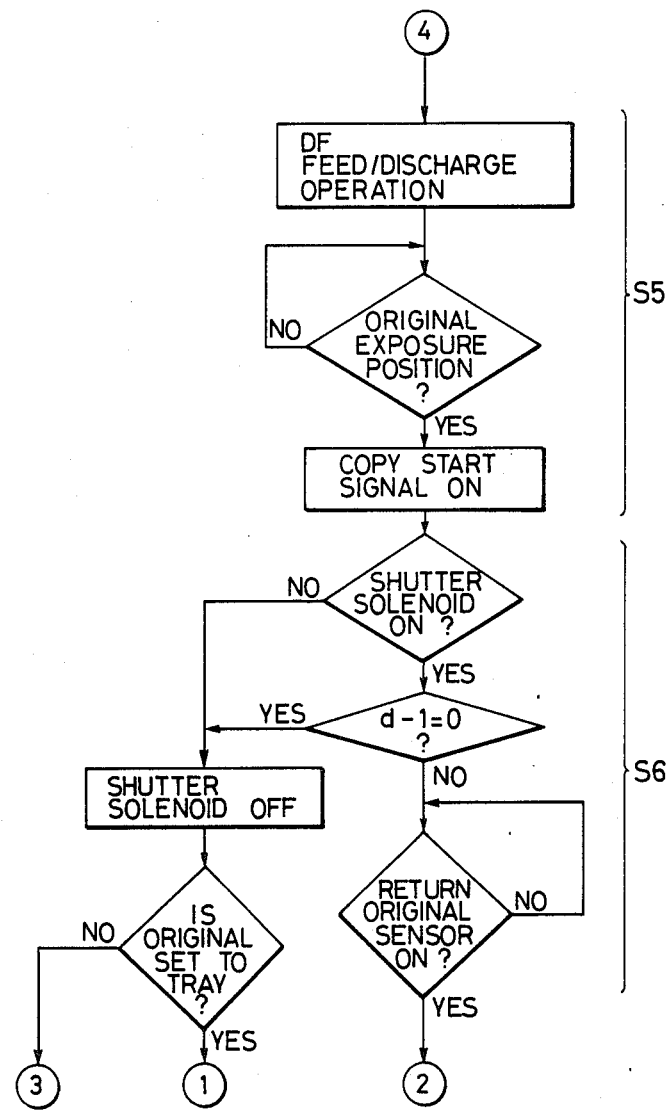
Figure 15C:
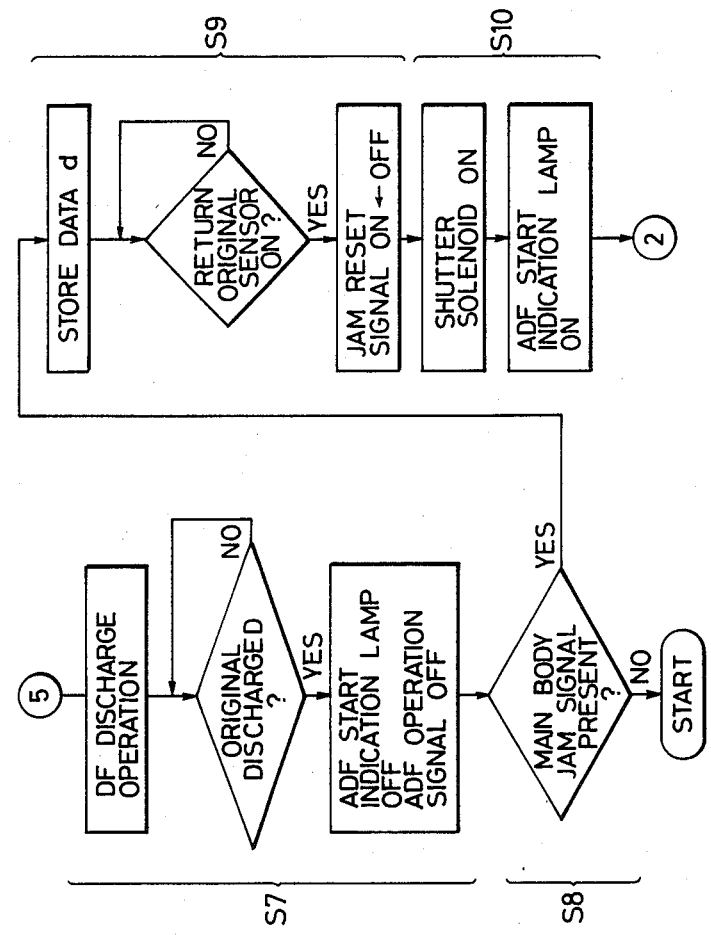

FIGS. 15A to 15C show an example of the operation sequence of the control section in the ADF In step S1, the shutter solenoid is turned off to close a return original port through which the originals are returned to the ADF. It is next checked if the operator has set the originals on an original tray 1. If YES, it is then checked if the operator has depressed the ADF start switch 39.

If YES in step S1, the flow advances to step S2. In step S2, the ADF start display lamp 41 in the ADF control panel is turned on. An ADF operation signal SAO representing that the ADF is in operation is supplied to the copying machine main body C. The AF separation operation is performed wherein one original is separated and supplied to the DF section.

In step S3, the original is separated at the AF section, and it is checked in accordance with the detection signal from the DF original sensor 29 whether the original is conveyed to the DF section. When the DF original sensor 29 detects the original, the DF section is set in the standby mode or waiting status, and the flow goes to step S4.

In step S4, the copy start signal SCS is turned off, and the unnecessary operation of the copying machine main body C is prohibited. It is then checked if the ADF start signal SAS is produced from the copying machine main body C. If the signal SAS is not produced from the copying machine main body C, the flow goes to the monitor routine for keep checking if a main body jam signal is produced from the copying machine. If it is determined that the ADF start signal is produced, it is then checked if the DF original sensor 29 has detected the original. If the DF original sensor 29 has detected the original, the flow advances to step S5. However, if the original has not been detected or if the main body jam signal has been produced, the flow advances to step S7.

In step S5, the feed/discharge operation of the original is performed, and it is checked if the fed original has reached the exposure position on the original glass platen 37. When the original reaches the exposure position, the copy start signal SCS is produced to command the start of the copy operation of the copying machine main body C.

In step S6, the output of a shutter solenoid to be described later is checked. When there is an output from the shutter solenoid, the data of sheet number of return originals supplied from the copying machine main body C is decremented to determine how many return originals have been copied. If not all the return originals have been returned, the output from the return original sensor 47 is checked. The flow returns to step S3 every time a return original is fed. When the shutter solenoid 49 is OFF or when all the return originals have been returned, the shutter solenoid 49 is turned off to return to the normal operation. It is then checked if an original is set on the tray 1. If the next original is detected, the flow goes to step S2. If the next original is not detected, the flow goes to step S7 through step S4.

In step S7, the original is discharged to the DF section. When the discharge of the original is completed, the ADF operation signal is turned off, the copying machine main body C commands an operation end to the ADF, and turns off the ADF start display lamp and the like, thereby signalling to the operator that the ADF has completed its operation.

In step S8, it is checked if there is a main body jam signal. If the main body jam signal is not detected, it is determined that the operation of the ADF has been completed. The ADF is then initialized and returns to step S1. However, when the main body jam signal is detected, it is determined that a jam has occurred at the copying machine main body C, as will be described later. In this case, in step S4 described above, the output of the main body jam signal has been detected. In step S7, the next original detected by the DF original sensor 12 is passed onto the platen to perform the complete discharge operation. When a main body jam occurs, the setting of the original on the AF tray is released, all the originals in the ADF are discharged, and the flow advances to step S9.

In step S9, the return original number data SSD supplied from the copying machine main body C is stored. After the main body jam reset to be described later is performed, the operator performs the original return operation in accordance with the return original number indication. When the return original is inserted in the return original insertion port and the interrupt original sensor 47 is turned on, the jam reset signal to be supplied to the copying machine main body C is turned off.

In step S10, the shutter solenoid 49 is turned on to open the shutter and to feed the return original to the inlet port of the DF section. After the ADF start display lamp 41 is turned on, the flow advances to step S3. Then, the DF section is operated in the manner as described above, and the copy operation is performed by the copying machine main body C. In step S6, after the return originals are turned in the number corresponding to the return original number data, the shutter solenoid is turned off, insertion of the original through the return original insertion port is prohibited, and the normal ADF operation is resumed. When the next original is at the original tray 1, the ADF operation is continued.

Figure 16:
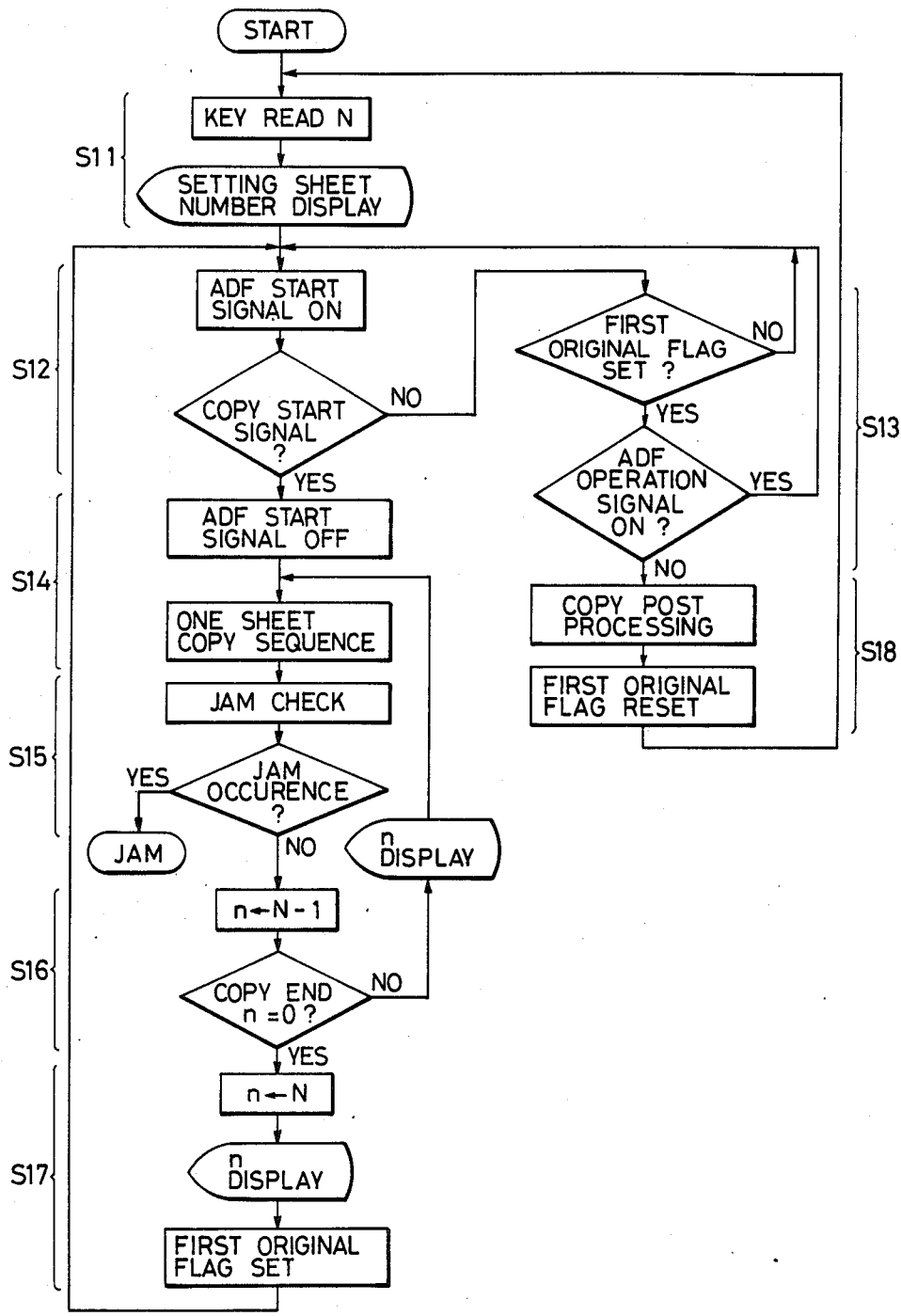

FIG. 16 is a flow chart of the sequence of the control section in the copying machine main body C. In step S11, when the operator sets a setting sheet number N using the numeral keys 153, the setting sheet number display 159 indicates the number N.

In step S12, the ADF start signal SAS for commanding start of the operation of the ADF is produced. In response to this signal, the ADF starts separating the original. The μCOMA checks the copy start signal which is supplied from the ADF when the original reaches the exposure position. In response to the copy start signal, the ADF start signal is turned off, the next original supplied from the ADF is stopped at the inlet port of the DF section, and the flow advances to step S14.

However, when the copy start signal is not supplied, the flow goes to step S13 to check a first original flag to be described later in the RAM of the μCOMA. If the flag is not set, the flow returns to step S12 and waits. If the flag is set, it is checked if the ADF operation signal SAO is supplied. If the ADF operation signal SAO is supplied, the flow returns to step S12 and waits. If the ADF operation signal SAO is not supplied, the flow goes to step S18 to perform copy post processing.

In step S14, a one sheet copy sequence for executing a copy operation of one sheet and a jam check are performed.

Figure 17:
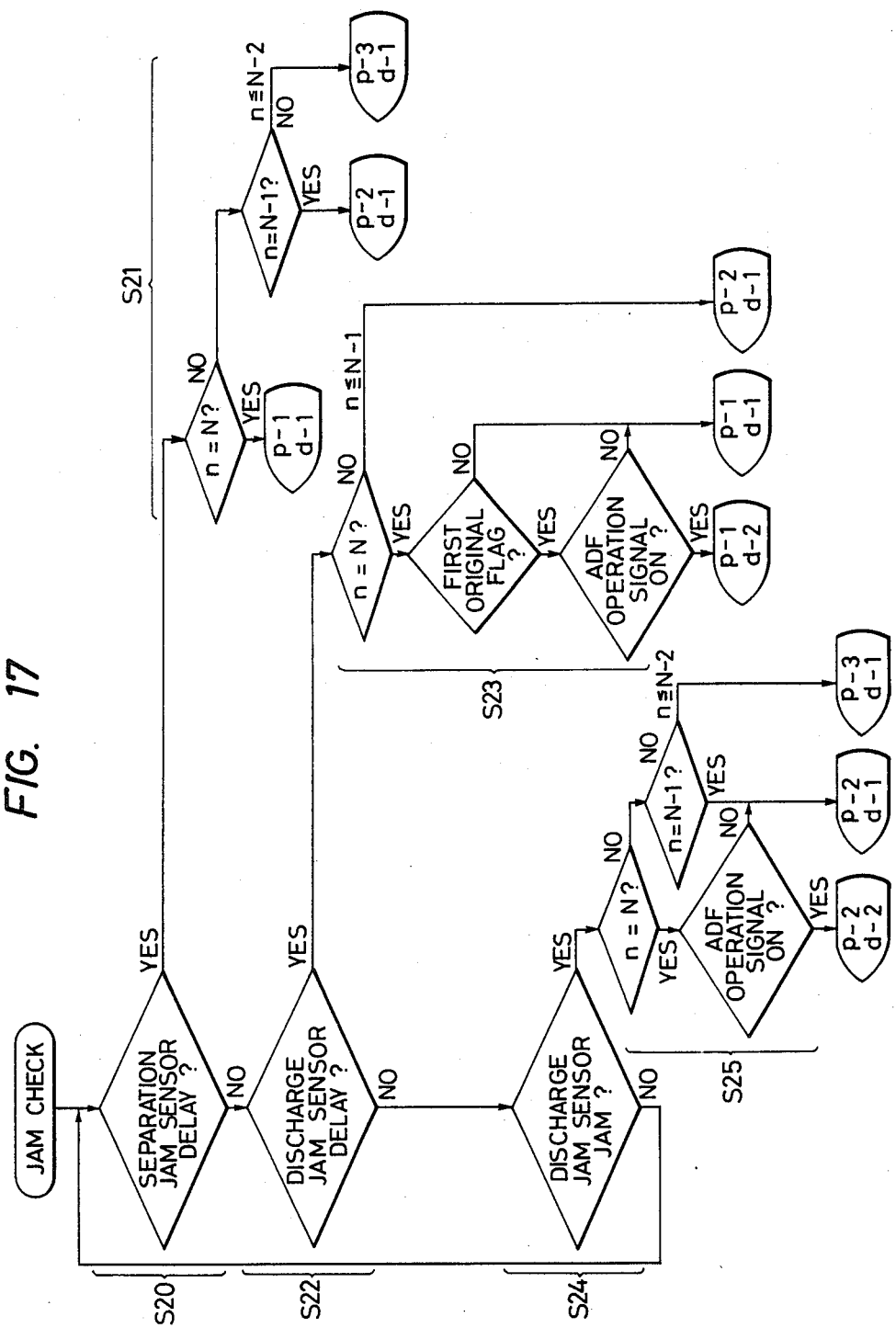
Figure 18:
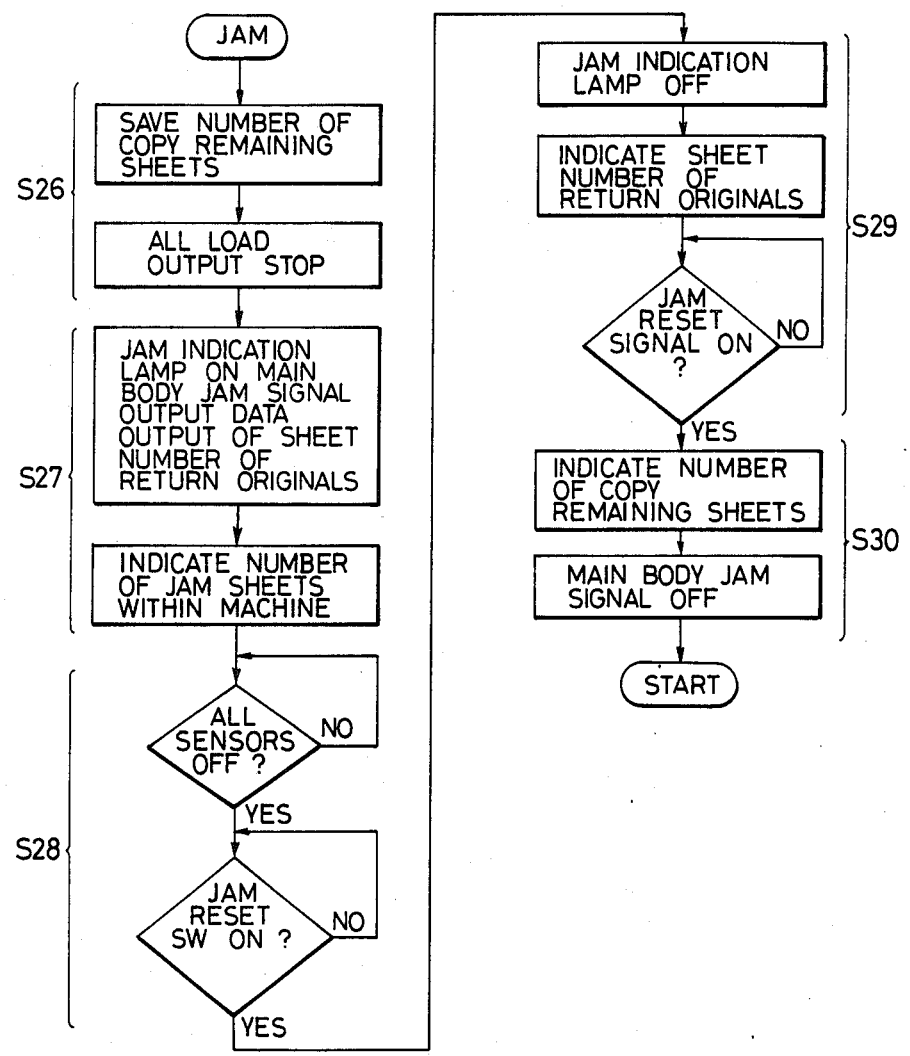

In step S15, the jam check routine shown in FIG. 17 is performed to check the occurrence of a jam. If no jam has occurred, the flow goes to step S16. However, if a jam has occurred, the flow goes to the jam recovery sequence (FIG. 18).

In step S16, the number of copy remaining sheets n=N−1 is calculated. If it is determined that n=0 when the one sheet copy sequence is completed, the flow goes to step S17. However, if it is determined that n≧1, the number n is displayed at the setting sheet number display 159, the flow returns to step S14, and the one sheet copy sequence is performed. When the one sheet copy sequence is completed, the copying machine main body is in the state which is the same as that after the inversion after the forward movement of the operation system 52.

In step S17, assuming that the copy operation for the setting sheet number has been completed, the setting sheet number N is set as the number n and is displayed at the setting sheet number display 159. The first original flag is set to indicate that the copy sequence for one original has been completed. The flow returns to step S12 to allow the ADF to start operation.

When it is determined in step S13 that the ADF operation is ended, the flow advances to step S18 to perform copy post processing. For example, post rotation of the drum is performed to clean the drum. The first original flag is reset, and the flow returns to the initial state and returns to step S1.

FIG. 17 is a flow chart showing the sequence for a jam check and for display processing when a jam is detected. In step S20, the occurrence of a delay jam is detected by the separation jam sensor 69. When the delay jam is detected, the flow goes to step S21. When the delay jam is not detected, the flow goes to step S22.

In step S22, the occurrence of the delay jam is detected by the discharge jam sensor 70. When the delay jam is detected, the flow goes to step S23. If not, the flow goes to step S24.

In step S24, occurrence of a clogging jam is detected by the discharge jam sensor 70. If a clogging jam is detected, the flow goes to step S25. If not, the flow returns to step S20. The jam position is continuously detected to detect the number of jam sheets in the copying machine. The number of return originals in the ADF is also detected, and the data thereon is stored. In the embodiment, a maximum of three originals can be on the convey path of the copying machine main body.

In step S21, the number N and the number of copy remaining sheets n are compared. If n=N, the number of jam sheets in the copying machine is stored as P-1 and the number of return originals is stored as d-1. When n=N-1, P-2 and d-1 are stored. When n≧N-2, P-3 and d-1 are stored. The stored data is used in a jam processing routine to be described later.

In step S23, if it is determined that n=N, the first original flag is set, and the ADF operation signal is produced (i.e., the original exchange has begun, one previous original has caused a jam, and the next original is being discharged before the jammed original), P-1 and d-2 are stored. However, if it is determined that the first original flag is reset or that the original flag is set and the ADF operation signal is OFF, P-1 and d-1 are stored. When n≧N-1, P-2 and d-1 are stored.

In step S25, if it is determined that n=N and the ADF operation signal is produced, P-2 and d-2 are stored. When n=N-1 or when the ADF operation signal is OFF, P-2 and d-1 are stored. When n≧N-2, P-3 and d-1 are stored.

FIG. 18 shows a flow chart of jam recovery processing.

In step S26, the data on the number of copy remaining sheets is saved in the RAM of the μCOMA, and all the loads performing the copy operation are stopped.

In step S27, the jam indication lamp 44 is turned on. The main body jam signal is supplied to the ADF, and the return original number data calculated in the jam check processing is produced. The number of jammed sheets or the data calculated in the jam check routine is displayed at the setting sheet number display 159.

At this time, the operator can be informed that a jam has occurred in the copying machine main body C. The jammed sheets are discharged from the copying machine main body in accordance with the display contents of the display 159. All the jam sensors are turned off. When the operator depresses the jam reset switch, the jam resetting of the copying machine main body C is performed. The flow then advances from step S28 to step S29 and the lamp indicator 158 is turned off.

In step S29, when it is determined that the ADF is in operation after the jam reset of the copying machine main body C, the data of the number of return originals at the ADF is displayed at the display 159. Then, the operator removes the originals on the discharge tray 28 and inserts them one by one from the return original insertion port. As described with reference to steps S9 to S10, the jam reset signal of the copying machine main body is produced. The shutter solenoid is turned on to allow insertion of originals into the DF section and renders the DF section operative. Meanwhile, the copying machine main body detects the presence/absence of the jam reset signal. When the jam reset signal is detected, the flow goes to step S30.

In step S30, the display contents of the setting sheet number display 159 are reset to the number data which was displayed before the jam occurred and was saved when the jam occurred. Thus, the main body jam signal is turned off, and the flow returns to start and awaits for reception of the copy start signal.

Figure 19:
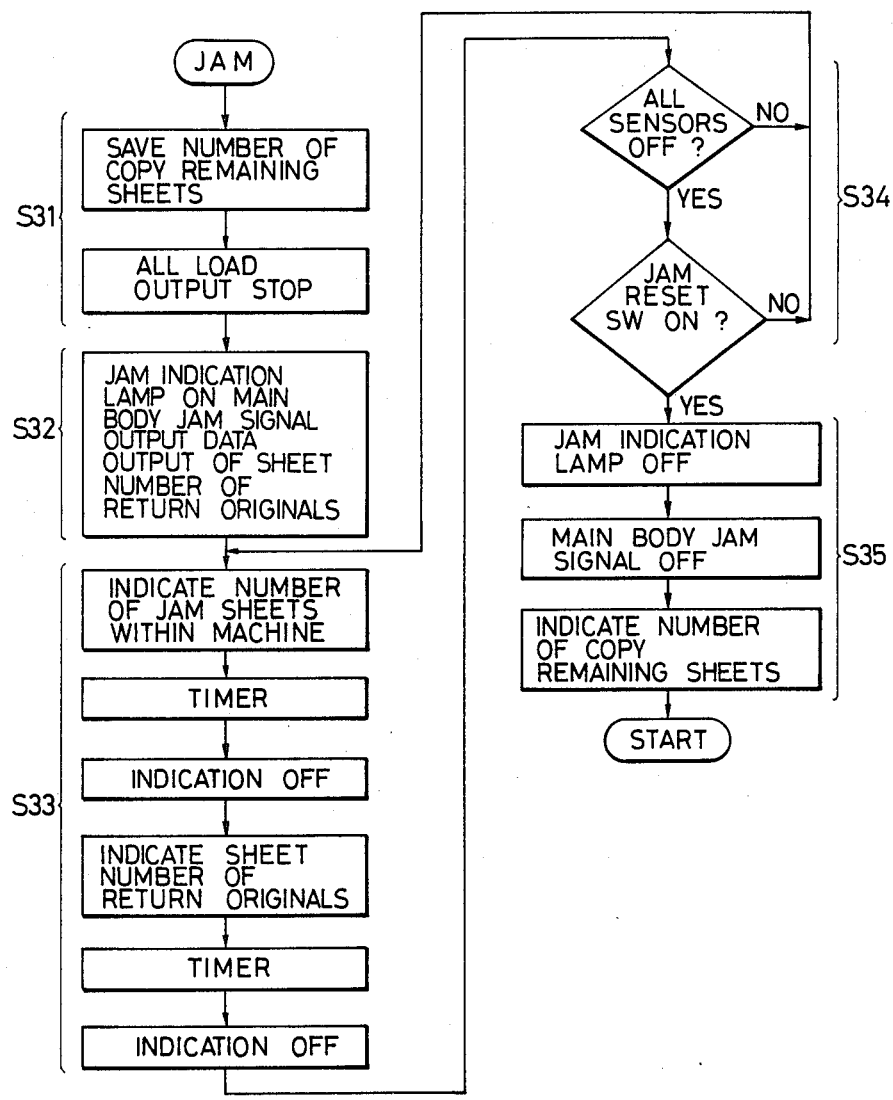

In the above embodiment, the number of jam sheets within the machine is displayed when a jam occurs. After the jam reset, the sheet number of return originals is displayed at the setting sheet number display. However, the number of jam sheets and the sheet number of return originals can be alternately displayed. FIG. 19 is a flow chart of such a flow sequence.

In step S31, the data of the number of copy remaining sheets is saved in the RAM of the μCOMA and all the loads are stopped when a jam occurs.

In step S32, the jam indication lamp 44 is turned on, and a main body jam signal is supplied to the ADF. Furthermore, the data of the sheet number of return originals which is calculated in the jam check routine shown in FIG. 17 is produced.

In step S33, the data of the sheet number of return originals which is calculated in the jam check routine shown in FIG. 17 and the number of jam sheets within the machine are alternately displayed at the setting sheet number display 159 at predetermined periods using a timer. Thus, the operator can be informed of the occurrence of a jam and the measure to be taken in the jam recovery processing.

In step S34, the operator removes the jammed sheets from the machine, turns off all the jam sensors, and depresses the jam reset switch 43 so as to perform the jam reset, in accordance with the display contents.

In step S35, the jam indication lamp 44 is turned on, the main body jam signal SCJ supplied to the ADF is turned off, and the display contents of the setting sheet number display 159 are returned to the saved contents before a jam occurred.

Meanwhile, the operator removes the return originals from the discharge tray 28, inserts them one by one from the return original insertion port, and actuates the DF section.

In this manner, according to the present invention, a return original insertion port for allowing insertion of return original is incorporated in addition to a normal original insertion port for feeding the original to the ADF. Therefore, when a convey abnormality such as a jam occurs and the image formation operation is to be resumed after the jam reset, the return originals can be sequentially inserted through the return original insertion port. Thus, image formation for these return originals can be performed. In addition, after the image formation for these return originals is completed, imgage formation for the originals on the original tray can be immediately started, thereby resulting in a simple operation.

Since the number of sheets remaining in the machine and the number of return originals are displayed, processing against abnormalities can be performed with high reliability, good operability, and safety.

When an abnormality occurs, all the originals in the ADF (in the case of the embodiment, the original at the exposure position of the glass platen and the original waiting at the inlet port of the DF section) can be discharged onto a discharge tray. Therefore, when the operator resumes the copy operation after an abnormality is recovered, he need not open the ADF and recover the return originals and can resume the copy operation with only a simple operation, thereby improving the processing efficiency.

In the above embodiment, when a jam occurs in the copying machine main body, the sheet number of return originals is displayed. However, a similar display may be provided when a jam occurs in the ADF, a sorter is used, a jam occurs in the sorter, or an interrupt mode such as an interrupt copy is set.

Separate displays for displaying the sheet number of return originals and the number of jam sheets within the machine can be provided.

What is claimed is:

1. An image forming apparatus comprising:
   original feeding means for feeding an original to a predetermined position;
   image forming means for forming on a recording medium an image of the original at the predetermined position;
   first detecting means for detecting transfer abnormality of the recording medium;
   second detecting means for detecting the number of originals which must be fed again to the predetermined position by said original feeding means when said first detecting means detects the transfer abnormality of the recording medium;
   display means for displaying data associated with an image formation by said image forming means; and
   control means for controlling said display means to display the number of originals which must be fed against to the predetermined position in accordance with an output from said second detecting means and, after release of the transfer abnormality, changing the display data.

2. An apparatus according to claim 1, wherein said display means displays a setting number of image forming sheets.

3. An apparatus according to claim 1, wherein said image forming means transfers the image on said recording medium onto another recording medium, and said first detection means detects a transfer abnormality of the another recording medium.

4. An apparatus according to claim 3, wherein the transfer abnormality is a jam of the another recording medium.

5. An apparatus according to claim 4, wherein said control means controls said display means so as to display the number of originals to be fed again after the jam is reset.

6. An image forming apparatus comprising:
   original feeding means for feeding an original to a predetermined position;
   image forming means for forming on a recording medium an image of the original at the predetermined position;
   first detecting means for detecting the number of originals which must be fed again to the predetermined position by said original feeding means when a transfer abnormality of the recording medium occurs;
   second detecting means for detecting the number of recording mediums remaining on a transfer path for the recording medium within said image forming means when the transfer abnormality of the recording medium occurs; and
   display means for displaying the number of originals which must be fed again and the number of recording mediums remaining on said transfer path in accordance with outputs from said first and second detecting means.

7. An apparatus according to claim 6, wherein said display means displays alternately the number of originals which must be fed again and the number of remaining recording mediums.

8. An apparatus according to claim 6, wherein the number of remaining recording mediums is displayed until the transfer abnormality is released, and thereafter the number of originals which must be fed again is displayed.

9. An apparatus according to claim 15, wherein the transfer abnormality is a jam of the recording medium.

10. An apparatus according to claim 6, wherein said display means displays a setting number of image forming sheets.

11. An original feeding apparatus comprising:
    supporting means for supporting an original thereon;
    transfer means for feeding the original from said supporting means along a predetermined feeding path to an exposure station, and for discharging the original along a predetermined delivery path after completion of the exposure; and
    control means for controlling said transfer means to discharge all the originals which are present on said feeding path and said delivery path when an interrupt mode occurs.

12. An apparatus according to claim 11, wherein said transfer means comprises pick-up means for picking up the original supported on said supporting means, separating/feeding means for separating/feeding the original picked up by said pick-up means, and convey means for conveying the original fed from said separating/feeding means to the exposure position and discharging it after completion of the exposure.

13. An apparatus according to claim 12, wherein said convey means has timing means for stopping the original fed by said separating/feeding means at an inlet port thereof to make the original wait, and thereafter conveying the original to the exposure position at a predetermined timing.

14. An apparatus according to claim 13, wherein said convey means has detecting means for detecting the original at said inlet port, and said control means controls said transfer means so that, after passage of the original is detected by said detecting means, the next original is picked up and waits at said inlet port.

15. An apparatus according to claim 14, wherein said control means controls said transfer means and said convey means so that the original at the exposure position and the original at said inlet port are discharged when the interrupt mode occurs.

16. An apparatus according to claim 11, wherein the interrupt mode occurs upon detection of a transfer abnormality of the recording medium in an image forming apparatus.

17. An apparatus according to claim 16, wherein the convey abnormality is a jam.

18. An image forming apparatus comprising:
separating/feeding means for separating an original and feeding the separated original to a predetermined position;
image forming means for forming on a recording medium an image of the original at the predetermined position, said image forming means having exposure means for exposing the original at the predetermined position; and
control means for controlling said separating/feeding means to perform, prior to discharging the original at the predetermined position after completion of an exposing operation, a separation operation for the next original so that the exposing operation for the original at the predetermined position and the separation operation for the next original are not overlapped.

* * * * *

UNITED STATES PATENT AND TRADEMARK OFFICE
CERTIFICATE OF CORRECTION

PATENT NO. : 4,621,921

DATED : November 11, 1986

INVENTOR(S) : NAOMI TAKAHATA, ET AL.

It is certified that error appears in the above-identified patent and that said Letters Patent is hereby corrected as shown below:

IN THE DRAWING:

Sheet 22 of 25, Fig. 16, "OCCURENCE" should be --OCCURRENCE--.

IN THE SPECIFICATION:

Column 6, line 43, change "time" to --lamp--.
    Column 8, line 2, change "DFSTART" to --DF START--;
            line 28, change "DFSTART" to --DF START--.
    Column 9, line 13, change "of of" to --off of--.
    Column 10, line 53, change "start" to --START--.
    Column 11, line 18, change "convey" to --conveyed--.
    Column 12, line 6, after "not" insert --been--.
    Column 15, line 8, after "ADF" insert --,--.
    Column 19, line 14, change "original" to --originals--;
            line 22, change "imgage" to --image--.

UNITED STATES PATENT AND TRADEMARK OFFICE
CERTIFICATE OF CORRECTION

PATENT NO. : 4,621,921

DATED : November 11, 1986

INVENTOR(S) : NAOMI TAKAHATA, ET AL.

It is certified that error appears in the above-identified patent and that said Letters Patent is hereby corrected as shown below:

IN THE CLAIMS:

Column 19, line 67 (Claim 1, line 18), change "against" to --again--.

Column 20, line 48 (Claim 9, line 1), change "15" to --6--.

Column 22, line 4 (Claim 17, line 2), change "convey" to --transfer--.

Signed and Sealed this

Twenty-fourth Day of February, 1987

Attest:

DONALD J. QUIGG

Attesting Officer — Commissioner of Patents and Trademarks